(12) United States Patent
Kashiwagi et al.

(10) Patent No.: US 9,300,929 B2
(45) Date of Patent: Mar. 29, 2016

(54) ILLUMINATION DEVICE AND PROJECTOR

(75) Inventors: Akihiro Kashiwagi, Shiojiri (JP); Akira Miyamae, Fujimi-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 888 days.

(21) Appl. No.: 13/348,113

(22) Filed: Jan. 11, 2012

(65) Prior Publication Data

US 2012/0188516 A1    Jul. 26, 2012

(30) Foreign Application Priority Data

Jan. 24, 2011  (JP) ................................ 2011-011919
Jun. 30, 2011  (JP) ................................ 2011-145410

(51) Int. Cl.
| | |
|---|---|
| G03B 21/14 | (2006.01) |
| H04N 9/31 | (2006.01) |
| G02B 7/00 | (2006.01) |
| G02B 26/00 | (2006.01) |
| G03B 21/20 | (2006.01) |
| G03B 33/08 | (2006.01) |
| G02B 27/14 | (2006.01) |

(52) U.S. Cl.
CPC .............. *H04N 9/3155* (2013.01); *G02B 7/006* (2013.01); *G02B 26/008* (2013.01); *G03B 21/204* (2013.01); *G03B 33/08* (2013.01); *G02B 27/149* (2013.01)

(58) Field of Classification Search
CPC ........... G03B 21/14; H05N 41/16; F21K 9/50
USPC .................. 353/84; 362/614, 217.08, 260, 84
See application file for complete search history.

(56) References Cited

U.S. PATENT DOCUMENTS

| | | | |
|---|---|---|---|
| 2009/0284148 A1 | 11/2009 | Iwanaga | |
| 2011/0043764 A1* | 2/2011 | Narikawa | ........................ 353/31 |
| 2011/0043765 A1 | 2/2011 | Shibasaki | |
| 2011/0096296 A1* | 4/2011 | Ogawa | ............................. 353/31 |
| 2011/0096300 A1* | 4/2011 | Shibasaki | ........................ 353/85 |

FOREIGN PATENT DOCUMENTS

| | | |
|---|---|---|
| JP | A-10-328837 | 12/1998 |
| JP | A-2009-277516 | 11/2009 |
| JP | A-2010-164846 | 7/2010 |
| JP | A-2011-43719 | 3/2011 |
| JP | A-2011-95391 | 5/2011 |
| JP | A-2011-95392 | 5/2011 |

* cited by examiner

*Primary Examiner* — William C Dowling
*Assistant Examiner* — Jerry Brooks
(74) *Attorney, Agent, or Firm* — Oliff PLC

(57) ABSTRACT

An illumination device includes a substrate including a fluorescent layer, and capable of rotating around a predetermined rotary shaft, a light source adapted to emit an excitation light adapted to excite the fluorescent layer, and a control device adapted to control emission of the light source so that, when the substrate is rotating, a first area of the fluorescent layer is irradiated with the excitation light in one round, and at least a part of the first area is not irradiated with the excitation light in another round.

10 Claims, 25 Drawing Sheets

|    | A | B | C |
|----|---|---|---|
| T1 | ○ | × | ○ |
| T2 | × | ○ | × |
| T3 | ○ | × | ○ |

FIG. 14

|     | A | B | C | D | E | F | G | H | I | J | K | L | M | N | O | P | Q |
|-----|---|---|---|---|---|---|---|---|---|---|---|---|---|---|---|---|---|
| T1  | O | O | O | O | O | O | O | × | × | × | O | O | O | O | O | O | O |
| T2  | × | × | × | O | O | O | O | O | O | O | × | × | × | O | O | O | O |
| T3  | O | O | O | × | × | × | O | O | O | O | O | O | O | × | × | × | O |
| T4  | O | O | O | O | O | O | × | × | × | O | O | O | O | O | O | O | × |
| T5  | × | × | O | O | O | O | O | O | O | × | × | × | O | O | O | O | O |
| T6  | O | O | × | × | × | O | O | O | O | O | O | O | × | × | × | O | O |
| T7  | O | O | O | O | O | × | × | × | O | O | O | O | O | O | O | × | × |
| T8  | × | O | O | O | O | O | O | O | × | × | × | O | O | O | O | O | O |
| T9  | O | × | × | × | O | O | O | O | O | O | O | × | × | × | O | O | O |
| T10 | O | O | O | O | × | × | × | O | O | O | O | O | O | × | × | × |   |
| T11 | O | O | O | O | O | O | O | × | × | × | O | O | O | O | O | O | O |

FIG. 18

|    | A | B | C | D |
|----|---|---|---|---|
| T1 | ○ | × | × | ○ |
| T2 | × | × | ○ | × |
| T3 | × | ○ | × | × |
| T4 | ○ | × | × | ○ |

FIG. 23

|  | A | B | C |
|---|---|---|---|
| $T_1$ | ○ | × | ○ |
| $T_2$ | ○ | × | ○ |
| $T_3$ | × | ○ | × |
| $T_4$ | × | ○ | × |
| $T_5$ | ○ | × | ○ |
| $T_6$ | ○ | × | ○ |

FIG. 25

ILLUMINATION DEVICE AND PROJECTOR

BACKGROUND

1. Technical Field

The present invention relates to an illumination device and a projector.

2. Related Art

As an illumination device for a projector, there have been known an illumination device described in JP-A-2009-277516 (Document 1) and an illumination device described in JP-A-2010-164846 (Document 2). In either of the illumination devices, the fluorescent body is excited by excitation light emitted from the light source to thereby emit fluorescence from the fluorescent body. In the illumination device of Document 1, a fluorescent layer is provided on a rotatable substrate (a fluorescent wheel). In the illumination device of Document 2, a fan-shaped fluorescent body for emitting red fluorescence, a fan-shaped fluorescent body for emitting blue fluorescence, and a fan-shaped fluorescent body for emitting green fluorescence are disposed on a rotatable fluorescent wheel so as to form a circle. In either of the illumination devices, the lights used as the image light and having respective colors different from each other can sequentially be obtained by irradiating the fluorescent wheel with the laser beam emitted from the light source while rotating the fluorescent wheel in a circumferential direction.

When raising the output level of the laser beam which is emitted from the light source and is incident on the fluorescent body from, the luminance of the fluorescence emitted by the fluorescent body rises while the temperature of the part of the fluorescent body thus irradiated becomes high to thereby accelerate deterioration of the fluorescent body. However, since the fluorescent layer is disposed on the rotatable substrate in either of the illumination devices, even if the part of the fluorescent layer corresponding to a focused spot is irradiated with the excitation light to thereby heat the fluorescent layer, the part promptly gets out of the focused spot, and is cooled by the ambient air until when the part is irradiated with the excitation light again. Therefore, rise in temperature of the fluorescent layer is suppressed, and deterioration in the fluorescent layer and degradation of wavelength conversion efficiency of the fluorescent layer are hard to occur compared to the case in which a certain part is continuously irradiated with the excitation light. Further, in the illumination device of Document 2, the rotating fluorescent wheel is reciprocated in the radial direction by operating a crank mechanism. Thus, the position on the fluorescent body where the laser beam is incident on is shifted in the radial direction of the fluorescent wheel to thereby further reduce the thermal damage of the fluorescent body.

Since the substrate of the illumination device of Document 1 rotates, the part irradiated with the excitation light in a certain round is cooled by the ambient air until the part is irradiated with the excitation light in the subsequent round again (after one rotational period elapses). However, the area in the fluorescent layer irradiated with the excitation light in each of the rounds is the same. In other words, since a certain part of the fluorescent layer is repeatedly irradiated with the excitation light in every round at short time intervals, the part is not sufficiently cooled, and it becomes unachievable to sufficiently suppress the rise in temperature of the fluorescent layer. As a result, there arise the deterioration of the fluorescent layer and the degradation of the wavelength conversion efficiency of the fluorescent layer.

In the illumination device of Document 2, a second electric motor for operating the crank mechanism is required besides a first electric motor for rotating the fluorescent wheel. Therefore, the structure thereof is complicated, which poses a problem for downsizing of the projector.

SUMMARY

An advantage of some aspects of the invention is to provide an illumination device and a projector, each of which emit high-quality fluorescence. In the illumination device and in the projector, it is hard to cause the deterioration of the fluorescent layer and the degradation of the wavelength conversion efficiency of the fluorescent layer, because the rise in temperature of the fluorescent layer is suppressed with a simple structure suitable for downsizing.

An aspect of the invention is directed to an illumination device including a substrate including a fluorescent layer, and capable of rotating around a predetermined rotary shaft, a light source, the light source intermittently emitting an excitation light to excite the fluorescent layer, a rotational period determination device adapted to control the rotation of the substrate so that, when the substrate is rotating, a first area of the fluorescent layer is irradiated with the excitation light in one round, and at least a part of the first area is not irradiated with the excitation light in another round, and an electric motor adapted to rotate the substrate.

According to this configuration, the area of the fluorescent layer irradiated with the excitation light is different between one round and another round. Therefore, the cooling effect of the fluorescent layer is stronger, and the rise in temperature of the fluorescent layer can be reduced compared to the case in which the area of the fluorescent layer irradiated with the excitation light is always the same in every round. Therefore, the illumination device having the fluorescent layer difficult to be deteriorated and to be degraded in the wavelength conversion efficiency can be provided. Further, since the position of the fluorescent body irradiated with the excitation light can be shifted using a single electric motor, the illumination device having a simple structure and small in size can be realized.

It is also possible for the rotational period determination device to control the rotation of the substrate so that, when the substrate is rotating, an area of the fluorescent layer irradiated with the excitation light in the one round and an area of the fluorescent layer irradiated with the excitation light in the another round does not overlap each other.

According to this configuration, the position of the fluorescent layer irradiated with the excitation light can surely be dispersed along the rotational direction of the substrate between one round and another round.

It is also possible for the rotational period determination device to control the rotation of the substrate so that, when the substrate is rotating, an area of the fluorescent layer that is not irradiated with the excitation light in the one round and an area of the fluorescent layer that is not irradiated with the excitation light in the another round does not overlap each other.

According to this configuration, the position of the fluorescent layer irradiated with the excitation light can surely be dispersed along the rotational direction of the substrate between one round and another round.

Assuming that the fluorescent layer is divided into a plurality of segments along a rotational direction of the substrate, it is also possible to make a cumulative light intensity of the excitation light incident on a first segment out of the plurality of segments per unit time and a cumulative light intensity of the excitation light incident on a second segment out of the plurality of segments different from the first segment per unit time equal to each other.

According to this configuration, it is possible to prevent the degree of deterioration of the fluorescent layer and the level of the wavelength conversion efficiency of the fluorescent layer from varying between the segments. Therefore, the illumination device which has longer operating life and is difficult to cause the variation in luminance during the lighting period can be provided. In this case, if the cumulative light intensity of the excitation light incident on each segment per unit time is equal between all of the segments, such an effect becomes the strongest.

It is also possible for the rotational period determination device to control the rotation of the substrate so that the rotation of the substrate is asynchronous with emission of the excitation light.

According to this configuration, the area of the fluorescent layer irradiated with the excitation light is different between one round and another round. Therefore, the cooling effect of the fluorescent layer is stronger, and the rise in temperature of the fluorescent layer can be reduced compared to the case in which the area of the fluorescent layer irradiated with the excitation light is always the same in every round. Therefore, the illumination device having the fluorescent layer difficult to be deteriorated and to be degraded in the wavelength conversion efficiency can be provided.

It is also possible to set the another round to a round following the one round.

According to this configuration, the position of the fluorescent layer irradiated with the excitation light can surely be dispersed along the rotational direction of the substrate between one round and the subsequent round.

It is also possible to make the cumulative light intensity of the excitation light irradiated per unit time equal between all of the segments.

According to this configuration, it is possible to enhance the effect of preventing the degree of deterioration of the fluorescent layer and the level of the wavelength conversion efficiency of the fluorescent layer from varying between the segments.

It is also possible that there is further provided an emission timing generation device adapted to generate an emission timing signal for controlling an emission timing of the light source, the emission timing signal having a period synchronous with a frame period, and the rotational period determination device determines a rotational period, which is a non-integral multiple of a period of the emission timing signal, as a rotational period of the substrate.

According to this configuration, the position of the fluorescent layer irradiated with the excitation light can surely be dispersed along the rotational direction of the substrate round by round.

It is also possible for the rotational period determination device to determine the rotational period which is a quotient of the period of the emission timing signal and a non-integral number.

According to this configuration, since the irradiation position of the excitation light in the fluorescent body moves continuously, the rise in temperature of the irradiation region of the fluorescent body can be reduced to thereby extremely slow the deterioration of the fluorescent body, and thus high-quality fluorescence can be obtained.

It is also possible that there are further provided a light detection section adapted to detect fluorescence emitted from the fluorescent layer, a light source drive section adapted to make the light source emit light at the period of the emission timing signal, and a light source output level adjustment section, the light source output level adjustment section generates an emission level correction signal in accordance with a detection result of the light detection section, and the light source drive section corrects an output level of the excitation light emitted from the light source in accordance with the emission level correction signal.

According to this configuration, it is possible to reduce the variation in the intensity of the light emitted from the fluorescent body to thereby obtain higher quality fluorescence.

Assuming that a duty ratio of a light-emitting period of the light source is $\delta$ ($0<\delta<1$), it is also possible for the rotational period determination device to determine a period, which is ($1+\delta$) times of the period of the emission timing signal, as the rotational period of the substrate.

According to this configuration, assuming that the least common multiple of the rotational period of the rotating fluorescent plate and the light-emitting period of the light source is one unit time, the irradiation position of the excitation light can periodically be varied every unit time. Further, if the fluorescent body is divided into a plurality of segments along the rotational direction of the substrate, it is possible to make the cumulative light intensity of the excitation light incident on each segment per unit time equal between all of the segments.

It is also possible that the duty ratio $\delta$ is smaller than or equal to 0.5.

According to this configuration, since the area irradiated with the excitation light in a certain round and the area irradiated with the excitation light in the subsequent round do not overlap each other, the rise in temperature of the fluorescent layer can effectively be prevented.

Another aspect of the invention is directed to a projector including a substrate including a fluorescent layer, and capable of rotating around a predetermined rotary shaft, a light source, the light source intermittently emitting an excitation light to excite the fluorescent layer, a rotational period determination device adapted to control the rotation of the substrate so that when the substrate is rotating, a first area of the fluorescent layer is irradiated with the excitation light in one round, and at least a part of the first area is not irradiated with the excitation light in another round, and an electric motor adapted to rotate the substrate, a light modulation element adapted to modulate fluorescence emitted from the fluorescent layer with an image signal, and a projection optical system adapted to project the fluorescence modulated by the light modulation element.

According to this configuration, the projector provided with the illumination device having the fluorescent layer difficult to be deteriorated and to be degraded in the wavelength conversion efficiency can be provided. Further, since the position of the fluorescent body irradiated with the excitation light can be shifted using a single electric motor, the projector provided with the illumination device having a simple structure and small in size can be provided.

Assuming that the fluorescent layer is divided into a plurality of segments along a rotational direction of the substrate, it is also possible to make a cumulative light intensity of the excitation light incident on a first segment out of the plurality of segments per unit time and a cumulative light intensity of the excitation light incident on a second segment out of the plurality of segments different from the first segment per unit time equal to each other.

According to this configuration, the projector provided with the illumination device which has longer operating life and is difficult to cause the variation in luminance during the lighting period can be provided.

It is also possible that there are further provided an emission timing generation device adapted to generate an emission timing signal for controlling an emission timing of the light source, the emission timing signal having a period synchronous with a frame period, a light detection section adapted to detect fluorescence emitted from the fluorescent layer, a light source drive section adapted to make the light source emit light at the period of the emission timing signal, and a light source output level adjustment section, the rotational period determination device determines a rotational period, which is a non-integral multiple of a period of the emission timing signal, as a rotational period of the substrate, the light source output level adjustment section generates an emission level correction signal in accordance with a detection result of the light detection section, and the light source drive section corrects an output level of the excitation light emitted from the light source in accordance with the emission level correction signal.

According to this configuration, it is possible to provide the projector including the illumination device capable of obtaining higher quality fluorescence with reduced variation in the intensity of the light from the fluorescent body.

BRIEF DESCRIPTION OF THE DRAWINGS

The invention will be described with reference to the accompanying drawings, wherein like numbers reference like elements.

FIG. 14 is a diagram showing the segments irradiated with excitation light round by round in a time-series manner.

FIG. 18 is a diagram showing the segments irradiated with excitation light round by round in a time-series manner.

FIG. 23 is a diagram showing the segments irradiated with excitation light round by round in a time-series manner.

FIG. 25 is a diagram showing the segments irradiated with excitation light round by round in a time-series manner in the sixth embodiment.

DESCRIPTION OF EXEMPLARY EMBODIMENTS

First Embodiment

Figure 1:
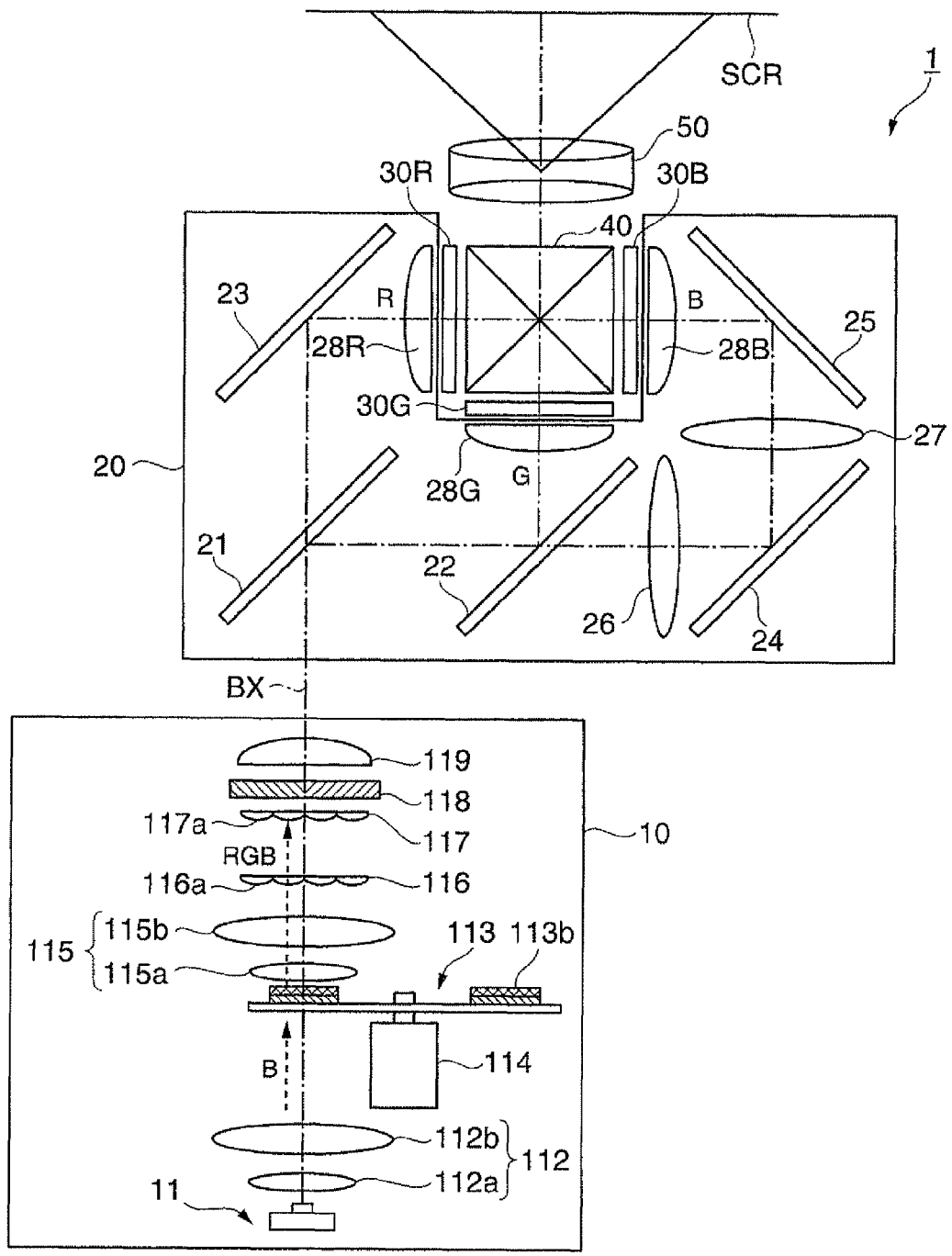
FIG. 1 is a schematic diagram schematically showing an overall configuration of a projector according to a first embodiment of the invention.

FIG. 1 is a schematic diagram schematically showing an overall configuration of a projector according to a first embodiment of the invention.

As shown in the drawing, the projector 1 is provided with an illumination device 10, a color separation light guide optical system 20, a red liquid crystal display element 30R, a green liquid crystal display element 30G, a blue liquid crystal display element 30B, a cross dichroic prism 40, and a projection optical system 50. It should be noted that hereinafter the red liquid crystal display element 30R, the green liquid crystal display element 30G, and the blue liquid crystal display element 30B might collectively be described as a liquid crystal display element 30. The liquid crystal display element 30 is a light modulation element.

The projector 1 projects image light based on an image signal externally supplied toward a screen SCR to thereby display the image on the screen SCR.

The illumination device 10 emits a white light having a light axis BX as the illumination light axis. The white light is a light forming the basis of the image light. The illumination device 10 is provided with a solid-state light source 11, a light collection optical system 112, the rotating fluorescent plate 113, an electric motor 114, a collimator optical system 115, a first lens array 116, a second lens array 117, a polarization conversion element 118, and an overlapping lens 119.

The solid-state light source 11 emits, for example, a blue laser beam (hereinafter also referred to simply as blue light) as the excitation light. The blue laser beam having the characteristics in which a peak of emission intensity appears at the wavelength of about 445 nm (nanometers) or about 460 nm. In the present embodiment, the explanation will be presented citing a device emitting a blue laser beam having the peak of the emission intensity at the wavelength of about 445 nm as an example of the solid-state light source 11.

As the solid-state light source 11, there is used, for example, one provided with a single semiconductor laser element, or one provided with a plurality of semiconductor laser elements formed to be arranged in a plane.

The light collection optical system 112 is provided with a single lens or a plurality of lenses such as a first lens 112a and a second lens 112b, and is provided on a light path between the solid-state light source 11 and the rotating fluorescent plate 113. The light collection optical system 112 collects the blue light emitted by the solid-state light source 11 at a predetermined position in the rotating fluorescent plate.

The rotating fluorescent plate 113 is rotatably supported by the electric motor 114, and is for converting one part of the blue light collected by the light collection optical system 112 into the fluorescence including the red light and the green light, and emitting the other part of the blue light described above, the red light, and the green light. Details of the rotating fluorescent plate 113 will be described later.

The electric motor 114 is for rotating the rotating fluorescent plate 113. The electric motor 114 receives a rotation instruction signal supplied from a motor drive section 63 described later, and then rotates a rotary shaft at a rotational period corresponding to the rotation instruction signal. Further, the electric motor 114 is provided with a position detection sensor realized by, for example, a hall element, and outputs position information representing a reference position of the rotary shaft detected by the position detection sensor.

The collimator optical system 115 is provided with a single lens or a plurality of lenses such as a first lens 115a and a second lens 115b, and roughly collimates the light coming from the rotating fluorescent plate 113.

The first lens array 116 has a plurality of micro lenses 116a arranged two-dimensionally, and divides the light thus roughly collimated by the collimator optical system 115 into a plurality of partial light beams. Specifically, the first lens array 116 is disposed so that the plurality of micro lenses 116a is arranged two-dimensionally in a plane perpendicular to the light axis BX.

It should be noted that the outer shape of the plurality of micro lenses 116a provided to the first lens array 116 is a roughly similar shape with respect to the outer shape of the image forming area of each of the red liquid crystal display element 30R, the green liquid crystal display element 30G, and the blue liquid crystal display element 30B.

The second lens array 117 has a plurality of micro lenses 117a corresponding to the plurality of micro lenses 116a provided to the first lens array 116. Specifically, the second lens array 117 is disposed so that the plurality of micro lenses 117a corresponding to the plurality of micro lenses 116a is arranged two-dimensionally in a plane perpendicular to the light axis BX. The second lens array 117 forms the image by each of the micro lenses 116a provided to the first lens array 116 in the vicinity of the image forming area of each of the red liquid crystal display element 30R, the green liquid crystal display element 30G, and the blue liquid crystal display element 30B in cooperation with the overlapping lens 119.

The polarization conversion element 118 has a polarization separation layer, a reflecting layer, and a retardation plate (all not shown), and emits the partial light beams divided into by the first lens array 116 after converting them into substantially single type of linearly polarized lights having polarization directions aligned with each other. The polarization separation layer transmits one of the linearly polarized components included in the light coming from the rotating fluorescent plate 113 without modification, and reflects the other of the linearly polarized components in a direction perpendicular to the light axis BX. The reflecting layer reflects the other linearly polarized component, which is reflected by the polarization separation layer, in a direction parallel to the light axis BX. The retardation plate converts the other linearly polarized component reflected by the reflecting layer into the one linearly polarized component.

The overlapping lens 119 is disposed so that the optical axis thereof coincides with the optical axis BX of the illumination device 10, and collects the partial light beams coming from the polarization conversion element 118 so as to overlap each other in the vicinity of the image forming area of each of the red liquid crystal display element 30R, the green liquid crystal display element 30G, and the blue liquid crystal display element 30B. The first lens array 116, the second lens array 117, and the overlapping lens 119 described above constitute a lens integrator optical system for homogenizing the light coming from the solid-state light source 11.

The color separation light guide optical system 20 separates the light coming from the illumination device 10 into red light, green light, and blue light, and then guides the colored lights to the red liquid crystal display element 30R, the green liquid crystal display element 30G, and the blue liquid crystal display element 30B, respectively.

The color separation light guide optical system 20 is provided with dichroic mirrors 21, 22, reflecting mirrors 23 through 25, relay lenses 26, 27, and collecting lenses 28R, 28G, and 28B.

The dichroic mirrors 21, 22 are mirrors each having a wavelength selective transmission film, which reflects the light in a predetermined wavelength range and transmits the light in the other wavelength band, formed on a transparent substrate. Specifically, the dichroic mirror 21 transmits the red light and reflects the green light and the blue light, and the dichroic mirror 22 reflects the green light and transmits the blue light.

The reflecting mirror 23 is a mirror for reflecting the red light. The reflecting mirrors 24, 25 are mirrors for reflecting the blue light. The relay lens 26 is disposed between the dichroic mirror 22 and the reflecting mirror 24.

The relay lens 27 is disposed between the reflecting mirror 24 and the reflecting mirror 25. Since the length of the light path of the blue light is larger than the lengths of the light paths of other colored lights, the relay lenses 26, 27 are provided in order to prevent or reduce the degradation of the light efficiency due to the diffusion of the light.

The collecting lenses 28R, 28G, and 28B collect the red light reflected by the reflecting mirror 23, the green light reflected by the dichroic mirror 22, and the blue light reflected by the reflecting mirror 25 in the image forming areas of the red liquid crystal display element 30R, the green liquid crystal display element 30G, and the blue liquid crystal display element 30B, respectively.

The red light transmitted through the dichroic mirror 21 is reflected by the reflecting mirror 23, and then enters the image forming area of the red liquid crystal display element 30R after passing through the collecting lens 28R. Further, the green light reflected by the dichroic mirror 21 is reflected by the dichroic mirror 22, and then enters the image forming area of the green liquid crystal display element 30G after passing through the collecting lens 28G. Further, the blue light reflected by the dichroic mirror 21 and then transmitted through the dichroic mirrors 22 enters the image forming area of the blue liquid crystal display element 30B after sequentially passing through the relay lens 26, the reflecting mirror 24, the relay lens 27, the reflecting mirror 25, and the collecting lens 28B.

The red liquid crystal display element 30R, the green liquid crystal display element 30G, and the blue liquid crystal display element 30B modulate the red light, the green light, and the blue light input thereto based on the image signal supplied externally to thereby generate red image light, green image light, and blue image light, respectively.

It should be noted that, although omitted from FIG. 1, entrance side polarization plates are disposed between the collecting lens 28R and the red liquid crystal display element 30R, the collecting lens 28G and the green liquid crystal display element 30G, and the collecting lens 28B and the blue liquid crystal display element 30B, respectively, so as to intervene therebetween, and exit side polarization plates are disposed between the red liquid crystal display element 30R, the green liquid crystal display element 30G, and the blue liquid crystal display element 30B, and the cross dichroic prism 40, respectively, so as to intervene therebetween.

The red liquid crystal display element 30R, the green liquid crystal display element 30G, and the blue liquid crystal display element 30B are each a transmissive display element having the liquid crystal airtightly encapsulated between a pair of transparent glass substrates, and are provided with, for example, polysilicon thin film transistors (TFT) as switching elements. The red liquid crystal display element 30R, the green liquid crystal display element 30G, and the blue liquid crystal display element 30B modulate the polarization directions of the red light, the green light, and the blue light (all linearly polarized lights) transmitted through the entrance side polarization plates described above using the switching operation of the switching elements based on the image signal to thereby generate the red image light, the green image light, and the blue image light, respectively.

The cross dichroic prism 40 combines the red image light, the green image light, and the blue image light coming from the respective exit side polarization plate described above with each other to thereby form a color image light of the light's three primary colors. Specifically, the cross dichroic prism 40 is an optical member formed by bonding four rectangular prisms to each other to form a cube. On the interfaces having an X shape on which the rectangular prisms are bonded to each other, there are formed dielectric multilayer films. The dielectric multilayer film formed on one of the X-shaped interfaces is for reflecting the red light, and the dielectric multilayer film formed on the other of the interfaces is for reflecting the blue light. The cross dichroic prism 40 aligns the proceeding directions of the red light and the blue light changed in proceeding direction by the dielectric multilayer films and the green light transmitted through the dielectric multilayer films to thereby combine the red light, the green light, and the blue light with each other.

The projection optical system 50 projects the color image light combined by the cross dichroic prism 40 toward the screen SCR in an enlarged manner.

Figure 2A:
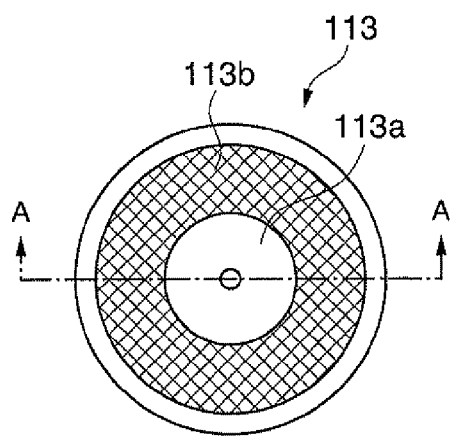
FIGS. 2A and 2B are diagrams showing a configuration of a rotating fluorescent plate provided to the projector.
Figure 2B:
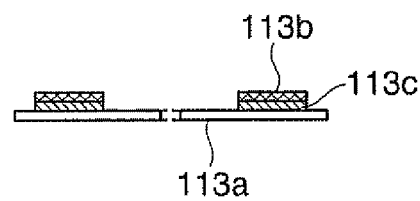

FIGS. 2A and 2B are diagrams showing a configuration of the rotating fluorescent plate 113 provided to the projector 1. FIG. 2A is a front view of the rotating fluorescent plate 113, FIG. 2B is a cross-sectional arrow view along the line A-A shown in FIG. 2A.

As shown in FIGS. 2A and 2B, the rotating fluorescent plate 113 is obtained by continuously forming a fluorescent body 113b as a single fluorescent layer on one of the surfaces of a circular disk 113a as a substrate having a light transmissive property along the circumferential direction of the circular disk 113a.

The circular disk 113a is formed using a material transmitting the blue light such as quartz glass, quartz crystal, sapphire, optical glass, or transparent resin. In the circular center of the circular disk 113a, there is formed a hole through which the rotary shaft of the electric motor 114 penetrates. It should be noted that although an example of using the circular disk 113a as the substrate is explained here, the shape of the substrate is not limited to the circular disk, but any flat plate can also be adopted.

The fluorescent body 113b has a property of converting apart of the blue light coming from the solid-state light source 11 into the fluorescence including the red light and the green light and transmitting another part of the blue light. As the fluorescent body 113b, a material including, for example, (Y, Gd)$_3$(Al, Ga)$_5$O$_{12}$:Ce as an yttrium aluminum garnet (YAG) fluorescent material can be used. As shown in FIG. 2B, the fluorescent body 113b is formed on one of the surfaces of the circular disk 113a via a dichroic film 113c for transmitting the blue light while reflecting the red light and the green light.

Figure 3A:
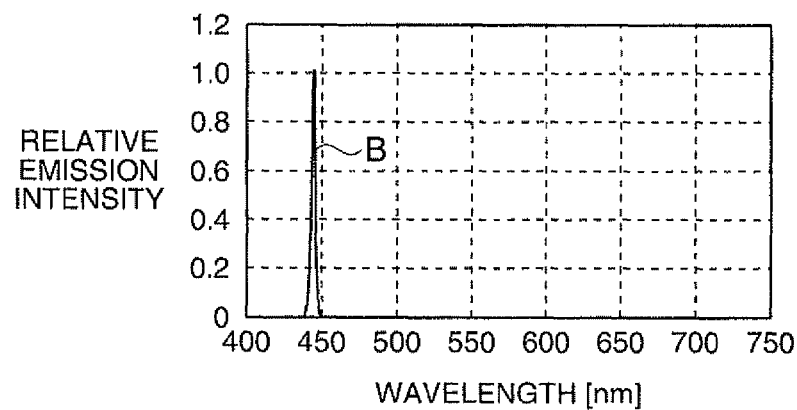
FIGS. 3A and 3B are diagrams showing optical characteristics of a fluorescent body provided to the rotating fluorescent plate.
Figure 3B:
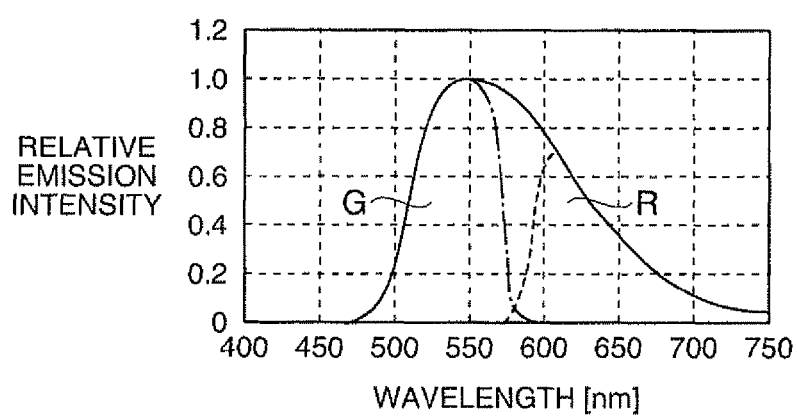

FIGS. 3A and 3B are diagrams showing optical characteristics of the fluorescent body 113b provided to the rotating fluorescent plate 113. FIG. 3A is a diagram showing the spectrum of the blue light entering the fluorescent body 113b, and FIG. 3B is a diagram showing the spectrum of the fluorescence converted into by the fluorescent body 113b. The graph indicated by the symbol B in FIG. 3A is an optical characteristic of the blue light emitted by the solid-state light source 11 as the excitation light. Further, the graph indicated by the symbol R in FIG. 3B is an optical characteristic of a color component, which can be used as the red light, out of the fluorescence converted into by the fluorescent body 113b. Further, the graph indicated by the symbol G in FIG. 3B is an optical characteristic of a color component, which can be used as the green light, out of the fluorescence converted into by the fluorescent body 113b. In other words, the fluorescent body 113b formed on the rotating fluorescent plate 113 converts apart of the blue light B having the spectrum shown in FIG. 3A into an yellow light (fluorescence) including the red light R and the green light G shown in FIG. 3B.

The rotating fluorescent plate 113 is disposed with the surface provided with the fluorescent body 113b directed to the side opposite to the side to which the blue light is input so that the blue light coming from the solid-state light source 11 enters the fluorescent body 113b from the circular disk 113a side. Further, the rotating fluorescent plate 113 is disposed in the vicinity of the light collection position of the light collection optical system 112 so that the blue light enters the area provided with the fluorescent body 113b in the state of being rotated by the electric motor 114.

Then, the configuration of the control system of the projector 1 according to the present embodiment will be explained.

Figure 4:
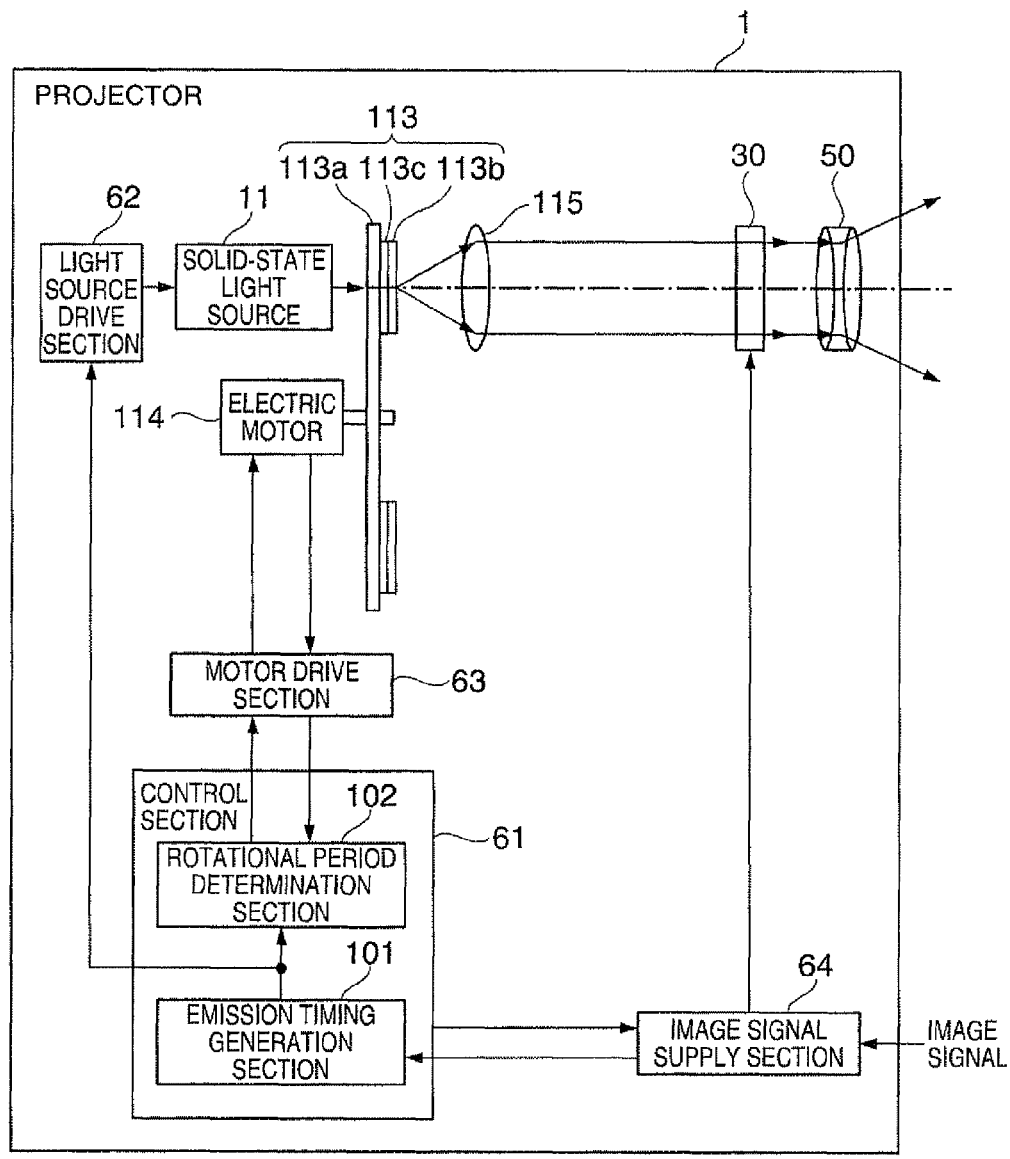
FIG. 4 is a block diagram showing a functional configuration of a control system for controlling an operation of the projector according to the embodiment.

FIG. 4 is a block diagram showing a functional configuration of the control system for controlling an operation of the projector 1. It should be noted that in the drawing, only the constituents necessary for the explanation are extracted from the constituents shown in FIG. 1, and are illustrated in a simplified manner.

As shown in FIG. 4, the projector 1 is provided with a control section 61, a light source drive section 62, a motor drive section 63, and an image signal supply section 64 as the control system.

The control section 61 is realized including a central processing unit (CPU), a read only memory (ROM), and a random access memory (RAM) (all not shown). The CPU reads out a control program stored in the ROM, then develops it in the RAM, and then executes steps of the program on the RAM. Due to the execution of the program by the CPU, the control section 61 controls the overall operation of the projector 1. The control section 61 supplies the image signal supply section 64 with an image output request signal in response to the execution of the control program.

As the functional constituents, the control section 61 is provided with an emission timing generation section 101 as an emission timing generation device, and a rotational period determination section 102 as a rotational period determination device.

The emission timing generation section 101 receives a frame sync signal supplied from the image signal supply section 64, then, in sync with the frame sync signal, generates an emission timing signal for controlling the emission period of the blue light as the excitation light emitted by the solid-state light source 11, and then supplies the light source drive section 62 and the rotational period determination section 102 with the emission timing signal. The frame sync signal is a sync signal for determining the frame period of the picture, and is a pulse signal having a frame rate of, for example, 60 frames per second (fps). The emission timing signal is, for example, a positive active pulse signal sync with the frame sync signal as described above. Specifically, if, for example, the frame rate of the frame sync signal is 60 fps, the emission timing signal is a positive active pulse signal having a period of, for example, 1/60 second or 1/120second sync with the frame frequency.

The rotational period determination section 102 receives the emission timing signal supplied from the emission timing generation section 101, then calculates the rotational period of the rotating fluorescent plate 113 asynchronous with the pulse period of the emission timing signal, and then supplies the motor drive section 63 with the value (the rotational period value) of the rotational period. Specifically, the rotational period determination section 102 obtains the rotational period value, which is a non-integral multiple of the pulse period of the emission timing signal and is the quotient of the pulse period of the emission timing signal and a non-integral number, and then supplies the motor drive section 63 with the rotational period value.

Further, the rotational period determination section 102 receives the position information of the rotary shaft of the electric motor 114 supplied from the motor drive section 63, and then determines based on the position information whether or not the rotary shaft of the electric motor 114 is rotating.

The light source drive section 62 receives the emission timing signal supplied from the emission timing generation section 101 of the control section 61, and then intermittently lights the solid-state light source 11 based on the timing indicated by the emission timing signal. Specifically, the light source drive section 62 lights the solid-state light source 11 in the positive period of the emission timing signal if the emission timing signal is a positive active pulse signal. In the present embodiment, the level of the excitation light emitted by the light source drive section 62 is constant.

The motor drive section 63 receives the rotational period value supplied from the rotational period determination section 102 of the control section 61, then generates the rotation instruction signal for designating the rotational period value, and then supplies it to the electric motor 114 to thereby drive the electric motor 114. Further, the motor drive section 63 receives the position information of the rotary shaft supplied from the electric motor 114, and then supplies the rotational period determination section 102 with the position information.

The image signal supply section 64 includes a sync signal generation section not shown, and supplies the emission timing generation section 101 of the control section 61 with a frame sync signal generated by the sync signal generation section. Further, the image signal supply section 64 receives the image output request signal supplied from the control section 61, and then supplies the red liquid crystal display element 30R, the green liquid crystal display element 30G, and the blue liquid crystal display element 30B with the image signal supplied externally in sync with the frame sync signal in accordance with the image output request signal.

Then the control of the projector 1 executed by the control system having the configuration described above will be explained.

Figure 5:
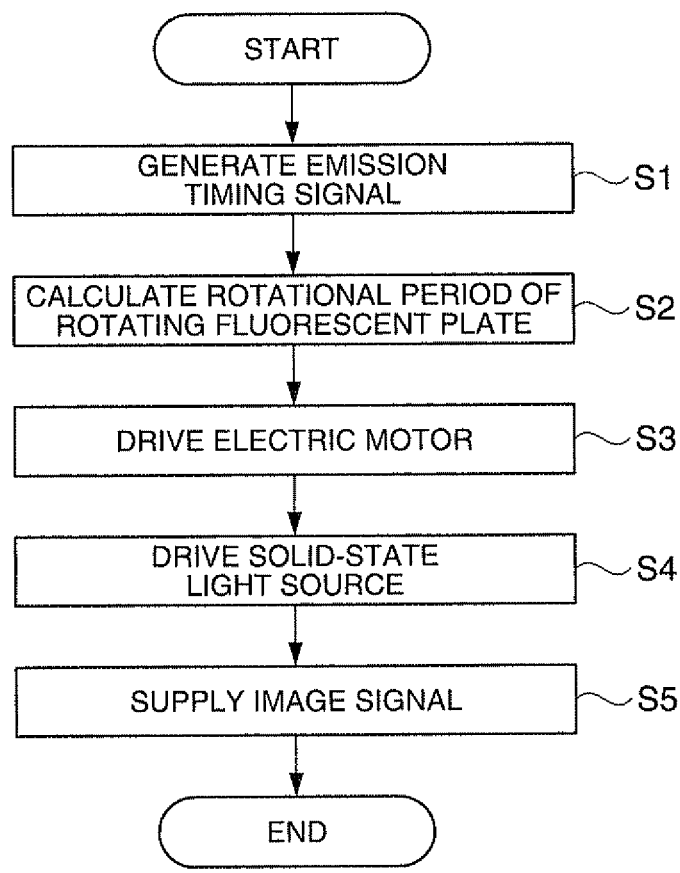
FIG. 5 is a flowchart showing a procedure of a process executed by the control system of the projector according to the embodiment.

FIG. 5 is a flowchart showing a procedure of a process executed by the control system of the projector 1 according to the present embodiment. When the control section 61 starts the control program, and the sync signal generation section of the image signal supply section 64 starts generation of the frame sync signal, the process of the flowchart shown in the drawing is started.

Firstly, in the step S1, the emission timing generation section 101 receives the frame sync signal supplied from the image signal supply section 64, then generates the emission timing signal sync with the frame sync signal, and then supplies the light source drive section 62 and the rotational period determination section 102 with the emission timing signal. For example, the emission timing generation section 101 receives the frame sync signal with the period of 1/60 second from the image signal supply section 64, then generates the emission timing signal (the positive active period of, for example, 0.1/120 second) having the period of 1/120 second and sync with the frame sync signal, and then supplies the light source drive section 62 and the rotational period determination section 102 with the emission timing signal.

Subsequently, in the step S2, the rotational period determination section 102 receives the emission timing signal supplied from the emission timing generation section 101, then calculates the rotational period of the rotating fluorescent plate 113 asynchronous with the pulse period of the emission timing signal, and then supplies the motor drive section 63 with the rotational period value. For example, if the pulse period of the emission timing signal is 1/120 second, the rotational period determination section 102 applies 4.3 as a non-integral number to thereby obtain 4.3/120 second, which is a value obtained by multiplying 1/120 second by 4.3, as the rotational period value, and then supplies it to the motor drive section 63. The non-integral number (denoting 4.3 in this example) can be determined in advance or arbitrarily set by the operator.

Then, in the step S3, the motor drive section 63 receives the rotational period value supplied from the rotational period determination section 102, then generates the rotation instruction signal for designating the rotational period value, and then supplies it to the electric motor 114 to thereby drive the electric motor 114. For example, the motor drive section 63 receives 4.3/120 as the rotational period value supplied from the rotational period determination section 102, then generates the rotation instruction signal designating the rotational period value, namely the rotation instruction signal instructing the electric motor 114 to rotate the rotary shaft at 120/4.3 ($\approx$27.9) revolution per second, and then supplies it to the electric motor 114.

Then, the motor drive section 63 receives the position information of the rotary shaft supplied from the electric motor 114, and then supplies the rotational period determination section 102 with the position information.

Subsequently, the rotational period determination section 102 receives the position information of the rotary shaft supplied from the motor drive section 63, and then determines based on the position information whether or not the electric motor 114 is rotating. If the rotational period determination section 102 determines that the electric motor 114 does not perform the rotational operation, the rotational period determination section 102 sets an abnormal flag representing an abnormal state. Then, if the abnormal flag is set, the control section 61 generates an alarm signal and outputs it to the outside, for example.

In the step S4, the light source drive section 62 receives the emission timing signal supplied from the emission timing generation section 101, and then lights the solid-state light source 11 based on the emission timing signal. For example, if the pulse period of the emission timing signal is 1/120 second (the positive active period of, for example, 0.1/120 second), the light source drive section 62 lights the solid-state light source 11 in the period (the period of 0.1/120 second) during which the emission timing signal is positive.

Then, in the step S5, the control section 61 supplies the image signal supply section 64 with the image output request signal.

Subsequently, the image signal supply section 64 receives the image output request signal supplied from the control section 61, and then supplies the red liquid crystal display element 30R, the green liquid crystal display element 30G, and the blue liquid crystal display element 30B with the image signal supplied externally in sync with the frame sync signal in accordance with the image output request signal.

By the control system of the projector 1 operating as described above, the projector 1 operates as described below.

When the electric motor 114 receives the rotation instruction signal supplied from the motor drive section 63, and then rotates the rotary shaft at the rotational period corresponding to the rotation instruction signal, the rotating fluorescent plate 113 fixed to the rotary shaft rotates at the rotational period. For example, when the electric motor 114 receives the rotation instruction signal which instructs the electric motor 114 to rotate the rotary shaft at 120/4.3 (approximately 27.9) revolution per second from the motor drive section 63, the electric motor 114 rotates the rotating fluorescent plate 113 at the rotational period of about 27.9 revolution per second.

Subsequently, the solid-state light source 11 emits the blue light as the excitation light while being driven by the light source drive section 62. For example, due to the drive by the light source drive section 62 based on the emission timing signal with the pulse period of 1/120 second (the positive active period of, for example, 0.1/120 second), the solid-state light source 11 emits the blue light in the period (the period of 0.1/120 second) during which the emission timing signal is positive. In other words, the solid-state light source 11 repeats the emission of the blue light for 0.1/120 second at a period of 1/120 second.

Since the emission period (e.g., 1/120 second) of the blue light emitted by the solid-state light source 11 and the rotational period (e.g., 4.3/120 second) of the rotating fluorescent plate 113 are asynchronous with each other, the irradiation position of the blue light on the fluorescent body 113b of the rotating fluorescent plate 113 circles with time.

Therefore, since in the projector 1 according to the present embodiment, the irradiation position of the blue light in the fluorescent body 113b moves continuously, the rise in temperature of the irradiation region of the fluorescent body 113b can be suppressed to thereby extremely slow the deterioration of the fluorescent body, and thus high-quality fluorescence can be obtained. Further, since the projector 1 has a configuration of shifting the irradiation position of the blue light on the fluorescent body 113b using the single electric motor 114, the illumination device 10 can be realized with a simple structure and a small size.

It should be noted that if the fluorescent body is mixed with transparent resin and formed on a surface of a flat plate, it is also possible to prevent the problem that the transparent resin is deteriorated to degrade the optical transmittance to thereby make the fluorescence darker.

Second Embodiment

Then, a projector according to a second embodiment of the invention will be explained. The overall configuration of the projector according to the present embodiment is substantially the same as that of the projector 1 according to the first embodiment shown in FIG. 1. It should be noted that the projector according to the present embodiment is different from the projector 1 according to the first embodiment in the control system. Hereinafter, in the explanation of the configuration, the constituents the same as those in the first embodiment will be denoted by the same reference symbols, and the explanation therefor will be omitted.

Figure 6:
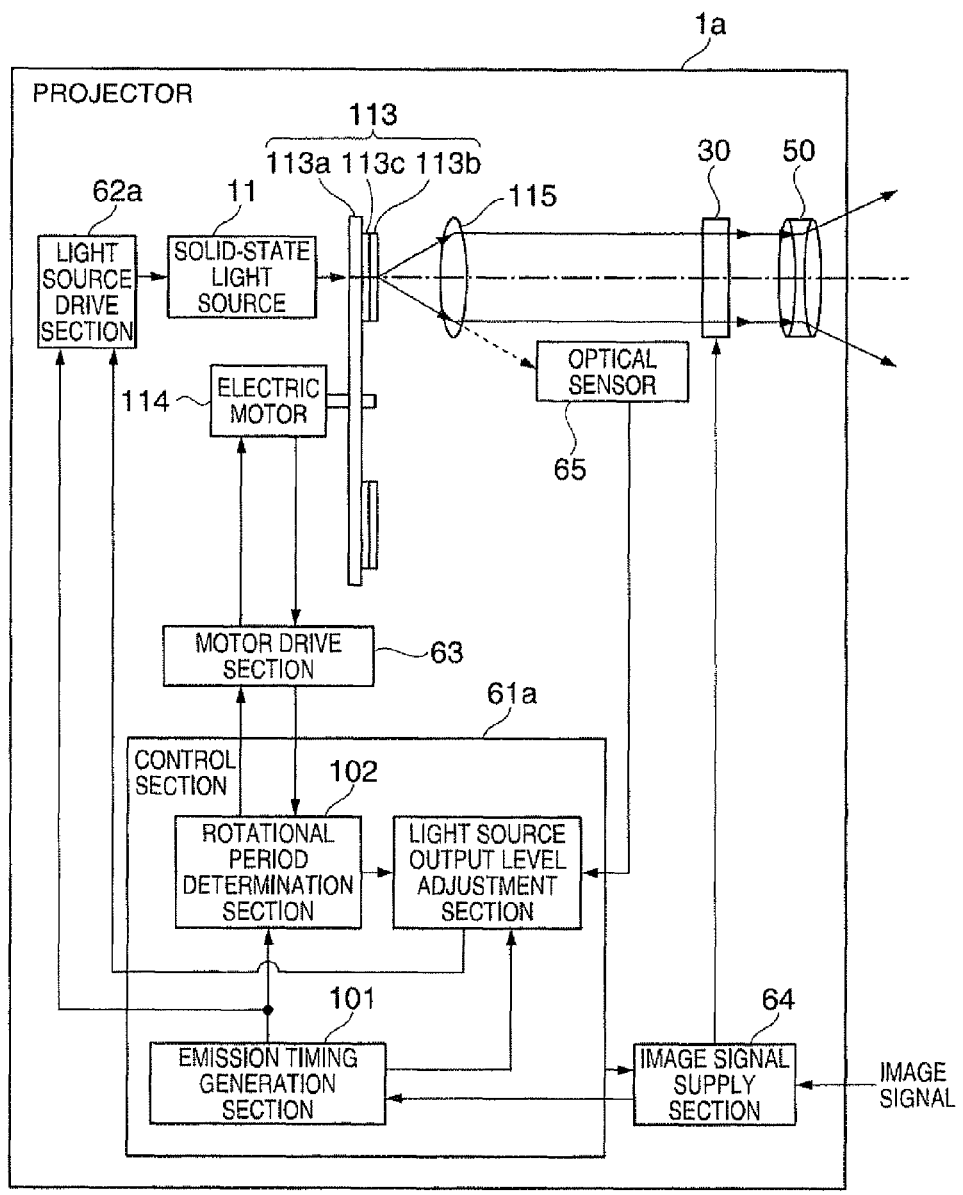
FIG. 6 is a block diagram showing a functional configuration of a control system for controlling an operation of a projector according to a second embodiment of the invention.

FIG. 6 is a block diagram showing a functional configuration of the control system for controlling an operation of the projector according to the present embodiment. It should be noted that in the drawing, only the constituents necessary for the explanation are extracted from the constituents shown in FIG. 1, and are illustrated in a simplified manner.

In the drawing, the projector 1a according to the present embodiment has a configuration provided with an optical sensor 65 as the control system, and including a control section 61a and a light source drive section 62a instead of the control section 61 and the light source drive section 62 in the projector 1 in comparison with the projector 1 according to the first embodiment.

The optical sensor 65 is, for example, a light intensity sensor, and detects the light intensity of the fluorescence emitted by the fluorescent body 113b, and then supplies it to the control section 61a. The optical sensor 65 is disposed at a position between the fluorescent body 113b provided to the rotating fluorescent plate 113 and the liquid crystal display element 30, and where the light beam entering the liquid crystal display element 30 is not blocked. It should be noted that the optical sensor 65 is disposed as close as possible to the light path thereof. This is for detecting the light not incident on the liquid crystal display element 30 out of the light beam proceeding from the fluorescent body 113b toward the liquid crystal display element 30. By detecting the light not incident on the liquid crystal display element 30, the optical sensor 65 can detect the fluorescence emitted from the fluorescent body 113b.

Specifically, the optical sensor 65 is disposed at a position between the illumination device 10 for emitting the white light and either one of the red liquid crystal display element 30R, the green liquid crystal display element 30G, and the blue liquid crystal display element 30B, and where the incident light to the red liquid crystal display element 30R, the green liquid crystal display element 30G, and the blue liquid crystal display element 30B is not blocked. If the optical sensor 65 is disposed in the vicinity of the light path between the illumination device 10 and the dichroic mirror 21 provided to the color separation light guide optical system 20, the optical sensor 65 can detect the light intensity of the white light emitted from the illumination device 10.

Further, if the optical sensor 65 is disposed in the vicinity of the light path between the dichroic mirror 21 and the red liquid crystal display element 30R, the optical sensor 65 can detect the light intensity of the red light. Further, if the optical sensor 65 is disposed in the vicinity of the light path between the dichroic mirror 22 and the green liquid crystal display element 30G, the optical sensor 65 can detect the light intensity of the green light. Further, if the optical sensor 65 is disposed in the vicinity of the light path between the dichroic mirror 22 and the blue liquid crystal display element 30B, the optical sensor 65 can detect the light intensity of the blue light. Further, if the optical sensor 65 is disposed in the vicinity of the light path between the dichroic mirrors 21, 22, the optical sensor 65 can detect the light intensity of the green light and the blue light.

Similarly to the first embodiment, the control section 61a is realized including the CPU, the ROM, and the RAM (all not shown). The CPU reads out a control program stored in the ROM, then develops it in the RAM, and then executes steps of the program on the RAM. Due to the execution of the program by the CPU, the control section 61a controls the overall operation of the projector 1a.

The control section 61a is further provided with a light source output level adjustment section 103 as one of the functional constituents compared to the control section 61 according to the first embodiment.

The light source output level adjustment section 103 receives the emission timing signal supplied from the emission timing generation section 101 as the emission timing generation device, the rotational period value of the rotating fluorescent plate 113 supplied from the rotational period determination section 102 as the rotational period determination device, a reference position signal including the position information of the rotary shaft of the electric motor 114 supplied from the rotational period determination section 102, and the value (the light intensity value) of the light intensity supplied from the optical sensor 65. Then, the light source output level adjustment section 103 specifies the region with low light intensity in the fluorescent body 113b as the region where the fluorescence is deteriorated based on the rotational period value and the reference position and the light intensity value included in the position information thus taken therein. Further, based on the location and the light intensity value of the region with the low light intensity and the emission timing signal, the light source output level adjustment section 103 generates an emission level correction signal for the region, and then supplies the light source drive section 62a with the emission level correction signal. Details of the operation of the light source output level adjustment section 103 will be explained later.

The light source drive section 62a receives the emission timing signal supplied from the emission timing generation section 101 and the emission level correction signal supplied from the light source output level adjustment section 103. Subsequently, the light source drive section 62a intermittently lights the solid-state light source 11 based on the timing indicated by the emission timing signal at the output value corrected with the emission level correction value represented by the emission level correction signal. Specifically, the light source drive section 62a lights the solid-state light source 11 in the positive period of the emission timing signal if the emission timing signal is a positive active pulse signal. In the present embodiment, the level of the excitation light emitted by the light source drive section 62a is a value corrected with the emission level correction value.

Figure 8:
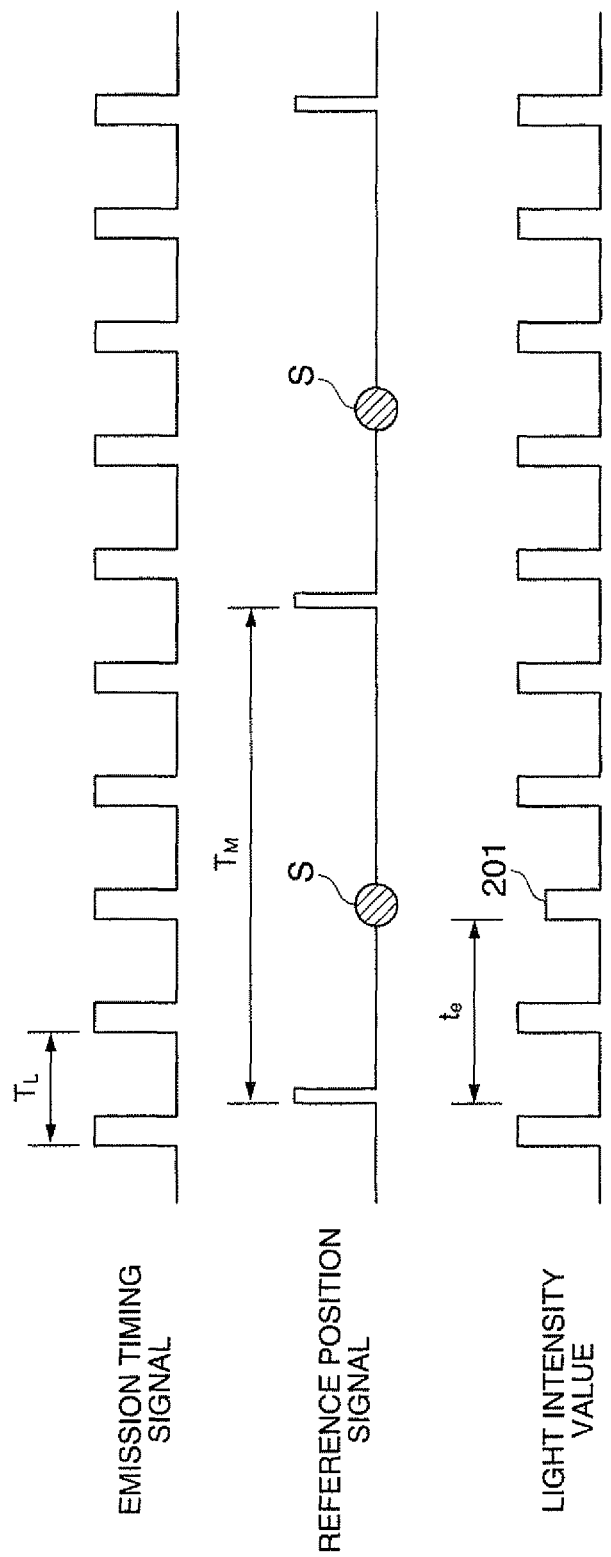
FIG. 8 is a timing chart showing the timing of various signals generated by the projector in the embodiment.
Figure 9:
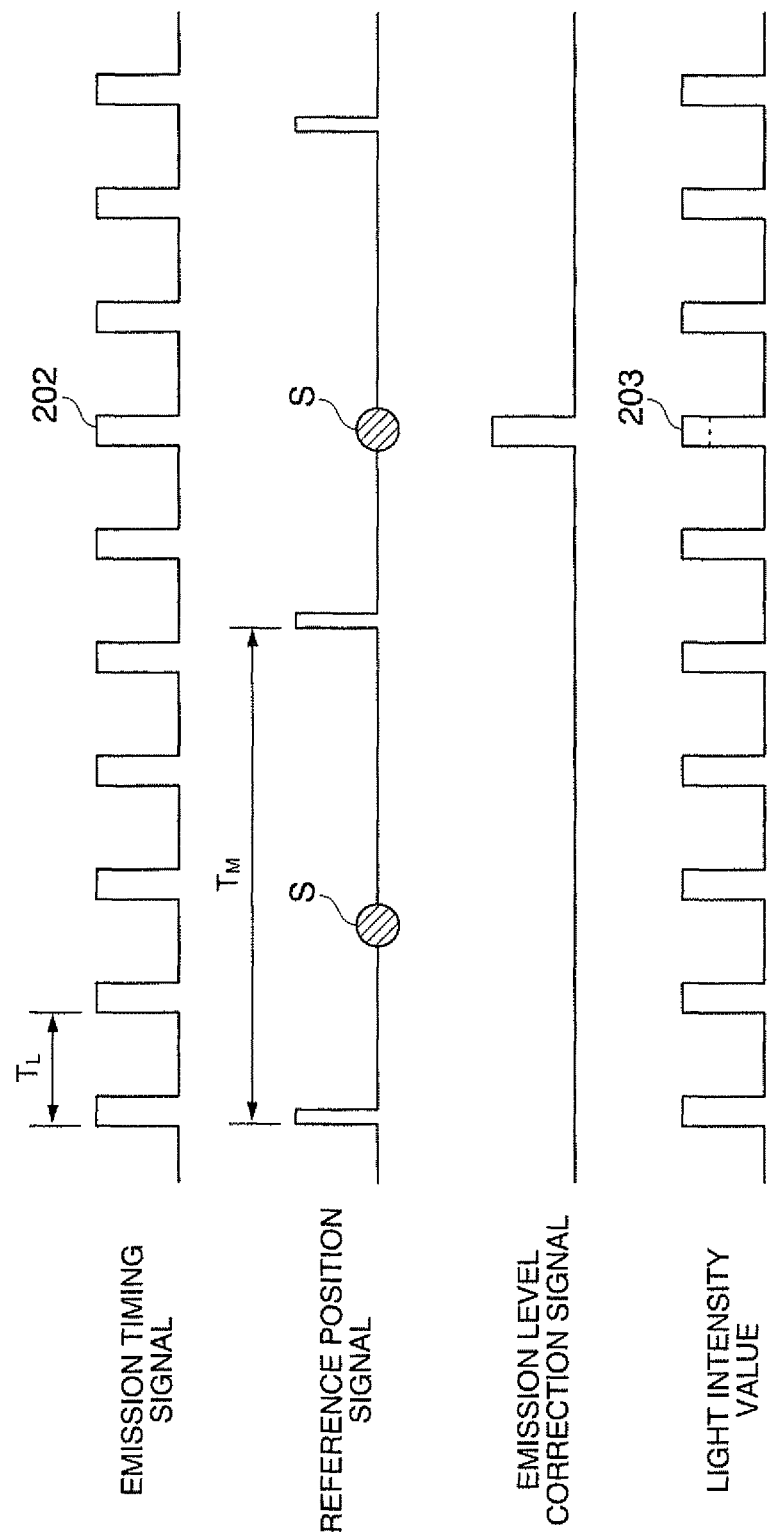
FIG. 9 is a timing chart showing the timing of the various signals generated by the projector in the embodiment.

Then the control of the projector 1a executed by the control system having the configuration described above will be explained with reference also to FIGS. 7 through 9.

Figure 7:
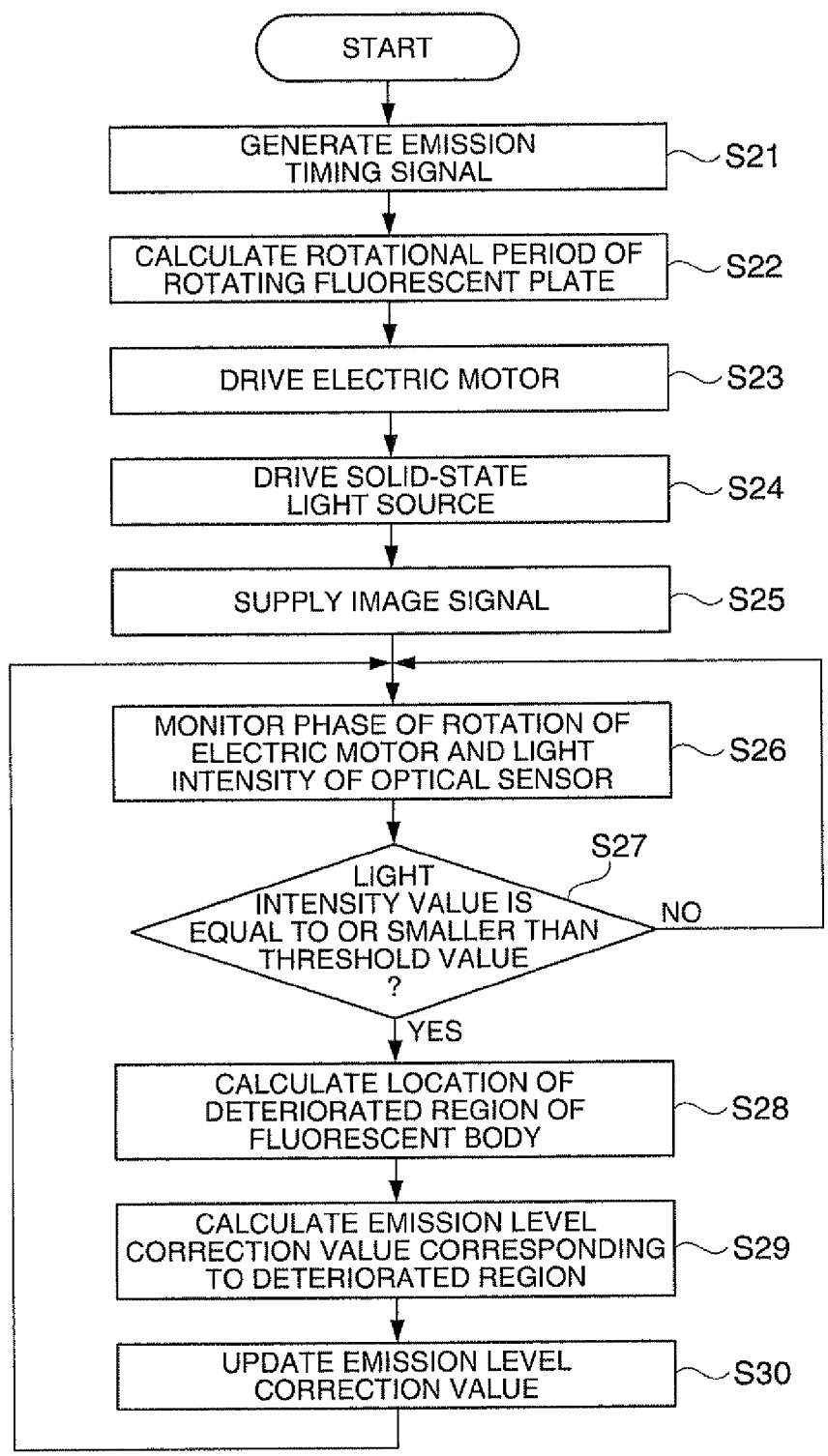
FIG. 7 is a flowchart showing a procedure of a process executed by the control system of the projector according to the embodiment.

FIG. 7 is a flowchart showing a procedure of a process executed by the control system of the projector 1a according to the present embodiment. When the control section 61a starts the control program, and the sync signal generation section of the image signal supply section 64 starts generation of the frame sync signal, the process of the flowchart shown in the drawing is started.

It should be noted that since the processes from the step S21 to the step S23 are the same as the processes from the step S1 to the step S3 in the first embodiment respectively, the explanation for the processes from the step S21 to the step S23 will be omitted.

Subsequently to the process of the step S23, the light source output level adjustment section 103 supplies the light source drive section 62a with the emission level correction signal having the emission level correction value set to 0 (zero, namely no correction) in the step S24.

Then, the light source drive section 62a receives the emission timing signal supplied from the emission timing generation section 101, and then receives the emission level correction signal supplied from the light source output level adjustment section 103.

Subsequently, the light source drive section 62a lights the solid-state light source 11 based on the timing indicated by the emission timing signal at the output value corrected with the emission level correction value represented by the emission level correction signal. It should be noted that since the emission level correction value is 0 (zero), no correction of the output value is performed here. For example, if the pulse period of the emission timing signal is 1/120 second (the positive active period of, for example, 0.1/120 second), the light source drive section 62a lights the solid-state light source 11 in the positive period (the period of 0.1/120 second) of the emission timing signal without correcting the output value.

Then, in the step S25, the control section 61a supplies the image signal supply section 64 with the image output request signal.

Subsequently, the image signal supply section 64 receives the image output request signal supplied from the control section 61a, and then supplies the red liquid crystal display element 30R, the green liquid crystal display element 30G, and the blue liquid crystal display element 30B with the image signal supplied externally in sync with the frame sync signal in accordance with the image output request signal.

Subsequently, in the step S26, the light source output level adjustment section 103 monitors the phase of the rotation of the electric motor 114 and the light intensity detected by the optical sensor 65. Specifically, the light source output level adjustment section 103 receives the emission timing signal supplied from the emission timing generation section 101, the rotational period value of the rotating fluorescent plate 113 supplied from the rotational period determination section 102, the reference position signal including the position information of the rotary shaft of the electric motor 114 supplied from the rotational period determination section 102, and the light intensity value supplied from the optical sensor 65.

Subsequently, in the step S27, the light source output level adjustment section 103 checks the light intensity value thus taken therein. For example, the light source output level adjustment section 103 determines whether or not the light intensity value is equal to or lower than a threshold value determined in advance. If the light source output level adjustment section 103 determines that the light intensity value is equal to or lower than the threshold value, the process proceeds to the step S28, and if it determines that the light intensity value exceeds the threshold value, the process returns to the step S26. Specifically, if the light source output level adjustment section 103 determines that the light intensity value 201 is equal to or lower than the threshold value in the timing chart shown in FIG. 8, the process proceeds to the step S28.

In the step S28, the light source output level adjustment section 103 specifies the region with low light intensity in the fluorescent body 113b as the region where the fluorescence is deteriorated based on the time point at which the light intensity value (equal to or lower than the threshold value) is taken therein, the time point corresponding to the reference position in the position information, and the rotational period value of the rotating fluorescent plate 113. Specifically, for example, in the timing chart shown in FIG. 8, the light source output level adjustment section 103 calculates the time $t_e$, which is a time difference between the time point at which the light intensity value 201 is taken therein and the time point corresponding to the reference position in the nearest reference position signal. It should be noted that in FIG. 8 the reference symbol $T_L$ denotes the period of the emission timing signal. Subsequently, the light source output level adjustment section 103 calculates the circling distance that the rotating fluorescent plate 113 proceeds from the reference position taking the time $t_e$ based on the time $t_e$ and the rotational period value $T_M$ of the rotating fluorescent plate 113, and then obtains the attained point as the location of the region S where the light intensity value becomes equal to or lower than the threshold value in the fluorescent body 113b.

Subsequently, in the step S29, the light source output level adjustment section 103 calculates the emission level correction value for correcting the light intensity value, which is a value equal to or lower than the threshold value. Specifically, for example, the light source output level adjustment section 103 firstly calculates the average value of a predetermined number of light intensity values near to the region S. Then, the light source output level adjustment section 103 calculates the difference between the average value and the light intensity value equal to or lower than the threshold value, and then determines the difference value as the emission level correction value.

Subsequently, in the step S30, the light source output level adjustment section 103 generates the emission level correction signal based on the location of the region with the low light intensity and the emission timing signal, and then supplies the light source drive section 62a with the emission level correction signal. The emission level correction signal represents the timing at which the time corresponding to the region with the low light intensity and the time indicating the illumination period in the emission timing signal match each other, and the emission level correction value. Specifically, for example, in the timing chart shown in FIG. 9, the emission level correction signal represents the timing (the time indicated by the reference numeral 202) at which the time corresponding to the region S with the low light intensity and the time indicating the illumination period in the emission timing signal match each other, and the emission level correction value. The light source output level adjustment section 103 generates the emission level correction signal described above, and then supplies the light source drive section 62a with the emission level correction signal. In the drawing, the reference numeral 203 denotes the light intensity value of the blue light with the output level corrected.

After the process of the step S30, the process returns to the step S26.

By the control system of the projector 1a operating as described above, the projector 1a operates as described below.

The electric motor 114 receives the rotation instruction signal supplied from the motor drive section 63, and then rotates the rotary shaft at a rotational period corresponding to the rotation instruction signal. Thus, the rotating fluorescent plate 113 fixed to the rotary shaft rotates at the same rotational period. For example, when the electric motor 114 receives the rotation instruction signal which instructs the electric motor 114 to rotate the rotary shaft at 120/4.3 (approximately 27.9) revolution per second from the motor drive section 63, the electric motor 114 rotates the rotating fluorescent plate 113 at the rotational period of about 27.9 revolution per second.

Subsequently, the solid-state light source 11 emits the blue light as the excitation light while being driven by the light source drive section 62a. For example, due to the drive by the light source drive section 62a based on the emission timing signal with the pulse period of 1/120 second (the positive active period of, for example, 0.1/120 second), the solid-state light source 11 emits the blue light in the positive period (the period of 0.1/120 second) of the emission timing signal. In other words, the solid-state light source 11 repeats the emission of the blue light for 0.1/120 second at the period of 1/120 second.

Since the emission period (e.g., 1/120 second) of the blue light emitted by the solid-state light source 11 and the rotational period (e.g., 4.3/120 second) of the rotating fluorescent plate 113 are asynchronous with each other, the irradiation position of the blue light on the fluorescent body 113b of the rotating fluorescent plate 113 circles with time.

The fluorescent body 113b formed continuously along the circumferential direction on one surface of the circular disk 113a of the rotating fluorescent plate 113 can generate a variation in intensity of the light emitted therefrom due to the variation in components thereof, coating conditions, and so on. Therefore, even in the initial condition, there may arise the variation in emission intensity depending on the region of the fluorescent body 113b in some cases.

Further, it is possible that the degree of progress of the deterioration is different between the regions of the fluorescent body 113b. Therefore, in some cases, the variation in the intensity of the emission from the fluorescent body 113b increases with time.

The projector 1a according to the present embodiment is arranged so that in such a case where the variation in the intensity of the emission from the fluorescent body 113b occurs, the region at which the light intensity value is lowered is detected taking the predetermined light intensity value as the threshold value, and the light source drive section 62a is controlled so as to increase the output level of the solid-state light source 11 when the solid-state light source 11 performs the irradiation of that region.

Therefore, since in the projector 1a according to the present embodiment, the irradiation position of the blue light in the fluorescent body 113b moves continuously, the rise in temperature of the irradiation region of the fluorescent body 113b can be suppressed to thereby extremely slow the deterioration of the fluorescent body. Further, since the projector 1a has a configuration of shifting the irradiation position of the blue light on the fluorescent body 113b using the single electric motor 114, the illumination device 10 can be realized with a simple structure and a small size. Further, the projector 1a can reduce the variation in intensity of the emission from the fluorescent body 113b to thereby emit higher-quality fluorescence.

It should be noted that if the fluorescent body is mixed with transparent resin and formed on a surface of a flat plate, it is also possible to prevent the problem that the transparent resin is deteriorated to degrade the optical transmittance to thereby make the fluorescence darker.

Third Embodiment

Figure 10:
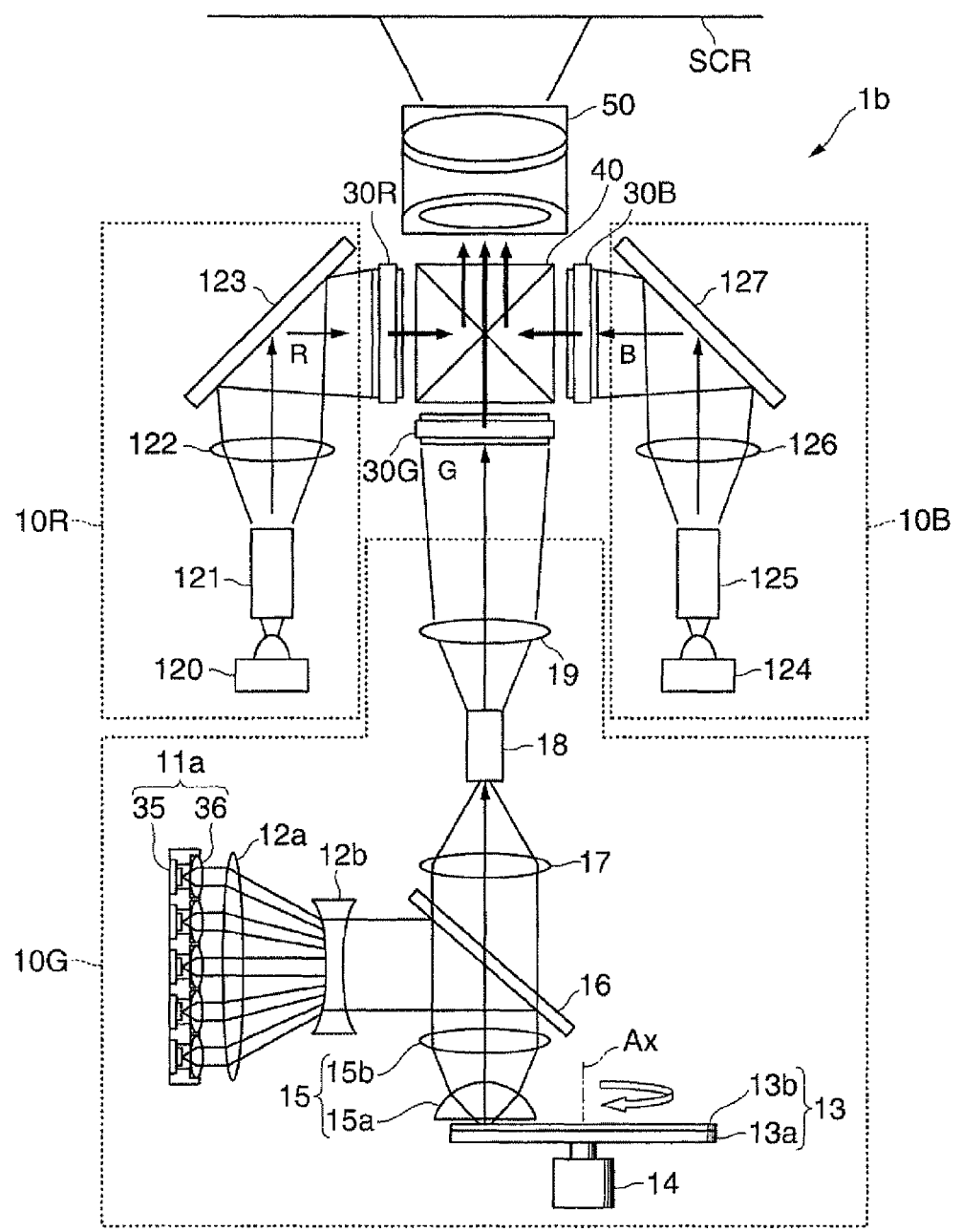
FIG. 10 is a schematic diagram of a projector according to a third embodiment of the invention.

FIG. 10 is a schematic diagram of a projector 1b according to a third embodiment.

The projector 1b is provided with a red light source device 10R, a green light source device 10G, a blue light source device 10B, the red liquid crystal display element 30R, the green liquid crystal display element 30G, and the blue liquid crystal display element 30B, a color combining optical system 40, and the projection optical system 50.

The green light source device 10G is provided with a light source 11a, a collecting lens 12a, a collimating lens 12b, a rotating fluorescent plate 13, an electric motor 14, a pickup optical system 15, a dichroic mirror 16, a collecting lens 17, a rod integrator 18, and a collimating lens 19.

The light source 11a is a solid-state light source array having optical elements, each composed of a solid-state light source 35 and a collimating lens 36 for collimating the light emitted from the solid-state light source 35, arranged in a 5×5 two-dimensional arrangement. As the solid-state light source 35, a semiconductor laser element (e.g., a laser diode (LD)) for emitting a blue laser beam as the excitation light is used, for example. The excitation light has a characteristic in which an emission intensity peak appears at a wavelength of about 450 nm, for example.

The excitation light emitted from the light source 11a is a light beam which is once thinned by the collecting lens 12a and the collimating lens 12b. Subsequently, the light path thereof is folded 90 degrees by the dichroic mirror 16, and then the excitation light is focused on the fluorescent body 13b of the rotating fluorescent plate 13 by the pickup optical system 15. The excitation light having entered the fluorescent body 13b has a roughly square shape, 1 mm on a side, as the whole of the focused spot.

The rotating fluorescent plate 13 is obtained by forming a fluorescent body 13b as a fluorescent layer on one surface of a circular disk 13a as a substrate continuously along the circumferential direction of the circular disk 13a. The rotating fluorescent plate 13 is rotatably supported by the electric motor 14, converts the excitation light collected by the pickup optical system 15 into the green fluorescence (hereinafter simply referred to as green light in some cases), and then emits the green fluorescence.

The circular disk 13a is made of a metal substrate such as an aluminum substrate. The surface of the circular disk 13a provided with the fluorescent body 13b is formed as a reflecting surface for reflecting the green light emitted from the fluorescent body 13b. In the circular center of the circular disk 13a, there is formed a hole through which a rotary shaft Ax of the electric motor 14 penetrates. It should be noted that although an example of using the circular disk 13a as the substrate is explained here, the shape of the substrate is not limited to the circular disk, but any flat plate can also be adopted.

The fluorescent body 13b is formed by applying the green fluorescent material, which is in a state of being mixed in transparent resin, to the surface of the circular disk 13a. As the green fluorescent material, β-SiALON ($(Si,Al)_6(O,N)_8$:Eu), silicate ($Ca_3Sc_2Si_3O_{12}$:Ce), and so on can be used. There are various types of green fluorescent materials besides the above, and any one of these materials can also be used. The transparent resin is silicone resin, and is mixed with the powder of the green fluorescent material, then applied and then thermally cured to thereby be fixed on the circular disk 13a. The circular disk 13a is also used as a radiator plate for efficiently radiating the heat generated in the fluorescent body.

The rotating fluorescent plate 13 is disposed with the surface provided with the fluorescent body 13b directed to the side to which the excitation light is input so that the excitation light emitted from the light source 11a enters the fluorescent body 113b from an opposite side to the circular disk 13a.

The electric motor 14 is for rotating the rotating fluorescent plate 13. The electric motor 14 receives the rotation instruction signal supplied from the motor drive section 63 described later, and then rotates the rotary shaft Ax at a rotational period corresponding to the rotation instruction signal. The electric motor 14 is provided with a position detection sensor realized by, for example, a hall element, and outputs position information representing a reference position of the rotary shaft Ax detected by the position detection sensor.

The pickup optical system 15 is provided with a single lens or a plurality of lenses such as a first lens 15a and a second lens 15b, and focuses the excitation light emitted from the light source 11a on the fluorescent body 13b, and at the same time, roughly collimates the green light emitted from the fluorescent body 13b.

The dichroic mirror 16 is a wavelength-selective transmissive/reflective member for reflecting the excitation light emitted from the light source 11a, and transmitting the green light emitted from the fluorescent body 13b. The green light emitted from the fluorescent body 13b is roughly collimated by the pickup optical system 15. Subsequently, the green light is recollected by the collecting lens 17 after the residual excitation light is removed therefrom by the dichroic mirror 16, and then passes through the rod integrator 18.

The rod integrator 18 is an optical member having a prismatic shape extending in the light path direction. Inside the rod integrator 18, the light is mixed and homogenized due to multiple reflection. The green light emitted from the rod integrator 18 is roughly collimated by the collimating lens 19, and enters the green liquid crystal display element 30G as the light modulation element.

The red light source device 10R is provided with a light source 120, a rod integrator 121, a collimating lens 122, and a reflecting mirror 123.

As the light source 120, a light emitting diode (LED) for emitting the red light is used, for example. The red light has a characteristic in which an emission intensity peak appears at a wavelength of about 600 nm, for example. The red light emitted from the light source 120 is homogenized in the luminance by the rod integrator 121, then roughly collimated by the collimating lens 122, and then enters the red liquid crystal display element 30R as the light modulation element via the reflecting mirror 123.

The blue light source device 10B is provided with a light source 124, a rod integrator 125, a collimating lens 126, and a reflecting mirror 127.

As the light source 124, a light emitting diode (LED) for emitting the blue light is used, for example. The blue light has a characteristic in which an emission intensity peak appears at a wavelength of about 450 nm, for example. The blue light emitted from the light source 124 is homogenized in the luminance by the rod integrator 125, then roughly collimated by the collimating lens 126, and then enters the blue liquid crystal display element 30B as the light modulation element via the reflecting mirror 127.

The red liquid crystal display element 30R, the green liquid crystal display element 30G, and the blue liquid crystal display element 30B are each a transmissive light modulation element having polarization plates attached to the both surfaces (a light entrance surface and a light exit surface) of the liquid crystal panel. The red liquid crystal display element 30R, the green liquid crystal display element 30G, and the blue liquid crystal display element 30B modulate the red light, the green light, and the blue light input from the red light source device 10R, the green light source device 10G, and the blue light source device 10B based on the image signal supplied externally to thereby generate red image light, green image light, and blue image light, respectively.

The color combining optical system 40 is a dichroic prism for combining the red image light, the green image light, and the blue image light generated respectively by the red liquid crystal display element 30R, the green liquid crystal display element 30G, and the blue liquid crystal display element 30B to thereby form color image light composed of the light's three primary colors. The cross dichroic prism is an optical member formed by bonding four rectangular prisms to each other to form a cube. On the boundary surfaces having an X shape on which the rectangular prisms are bonded to each other, there are formed dielectric multilayer films. The dielectric multilayer film formed on one of the X-shaped interfaces is for reflecting the red light, and the dielectric multilayer film formed on the other of the interfaces is for reflecting the blue light. The cross dichroic prism aligns the proceeding directions of the red light and the blue light changed in proceeding direction by the dielectric multilayer films and the green light transmitted through the dielectric multilayer films to thereby combine the red image light, the green image light, and the blue image light with each other.

The red image light, the green image light, and the blue image light combined by the color combining optical system 40 are projected on the screen SCR in an enlarged manner by the projection optical system 50, and recognized by the eyes of the user as a color image.

In the case of the present embodiment, the projector 1b is a projector for displaying a 3D image. The red liquid crystal display element 30R, the green liquid crystal display element 30G, and the blue liquid crystal display element 30B alternately generate the image for the right eye and the image for the left eye. The user observes the image for the right eye and the image for the left eye projected on the screen SCR using shutter type 3D glasses.

The 3D glasses set the shutters for the both eyes to OFF in a transitional period for switching the orientation of the liquid crystal from the image for the right eye to the image for the left eye or from the image for the left eye to the image for the right eye in the red liquid crystal display element 30R, the green liquid crystal display element 30G, and the blue liquid crystal display element 30B. Then, in the stage in which the orientation of the liquid crystal is completely switched, either one of the shutter for the right eye and the shutter for the left eye is set to ON. In this manner, display failure (crosstalk) due to the mixture of the image for the right eye and the image for the left eye is reduced.

In the transitional period until the orientation of the liquid crystal is completely switched, the shutters for the both eyes are set to OFF. Therefore, in the red light source device 10R, the green light source device 10G, and the blue light source device 10B, the output light intensity in the transitional period is set to zero (extinction) to reduce the power consumption. Therefore, in the red light source device 10R, the green light source device 10G, and the blue light source device 10B, there is performed the intermittent emission of setting the device to OFF in the transitional period and setting the device to ON in the non-transitional period.

Figure 11:
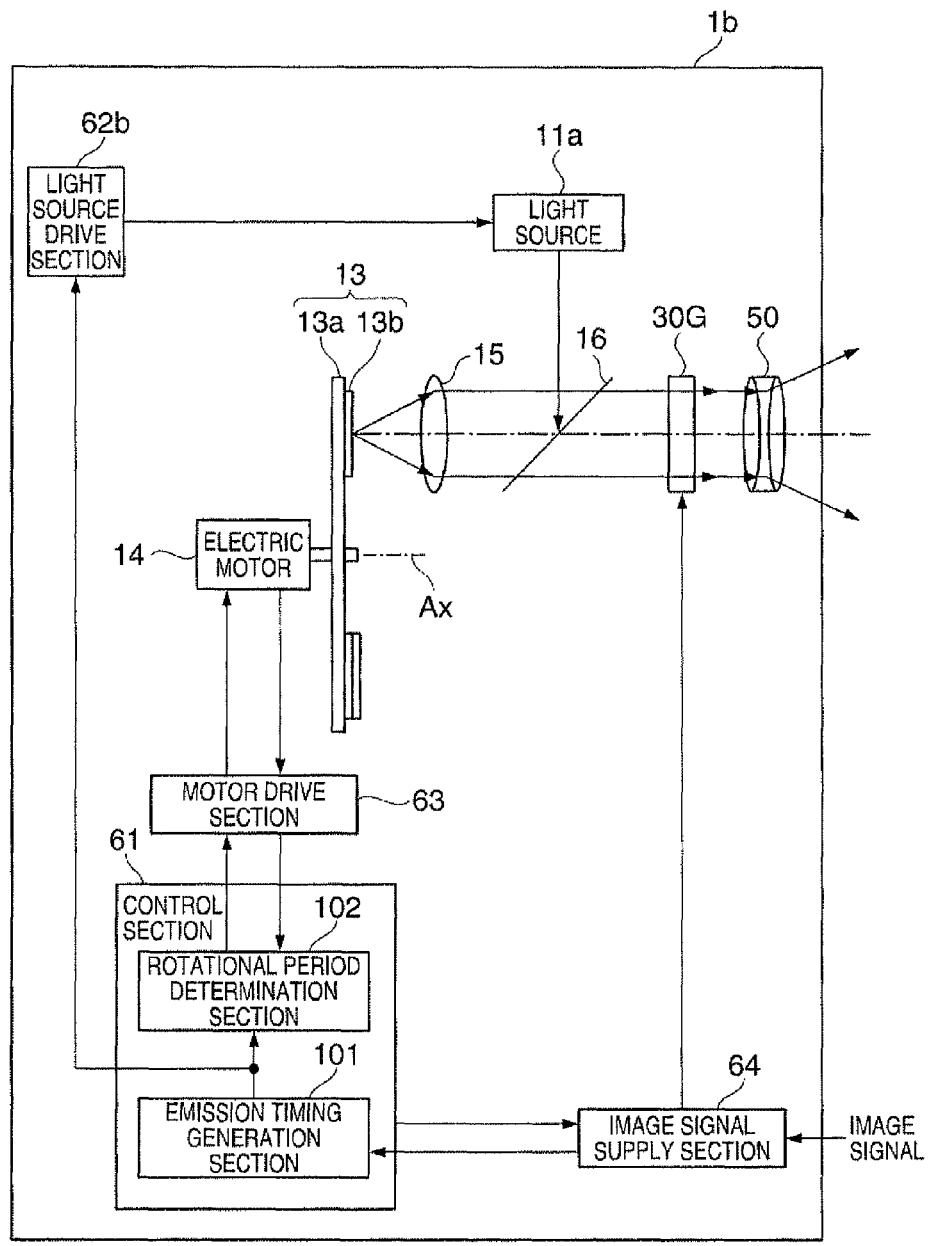
FIG. 11 is a block diagram showing a functional configuration of a control system for controlling an operation of the projector.

FIG. 11 is a block diagram showing a functional configuration of the control system for controlling an operation of the projector 1b. In FIG. 11, only the constituents necessary for the drive control of the light source 11a, which is one of the specifically characterizing sections in the invention, are extracted from the constituents shown in FIG. 10, and are shown in a simplified manner.

The projector 1b is provided with the control section (the control device) 61, a light source drive section 62b, the motor drive section 63, and the image signal supply section 64 as the control system.

The control section 61 is realized including the central processing unit (CPU), the read only memory (ROM), and the random access memory (RAM) (all not shown). The CPU reads out a control program stored in the ROM, then develops it in the RAM, and then executes steps of the program on the RAM. Due to the execution of the program by the CPU, the control section 61 controls the overall operation of the projector 1b. The control section 61 supplies the image signal supply section 64 with an image output request signal in response to the execution of the control program.

As the functional constituents, the control section 61 is provided with the emission timing generation section 101 as the emission timing generation device, and the rotational period determination section 102 as the rotational period determination device.

The emission timing generation section 101 receives the frame sync signal supplied from the image signal supply section 64, then generates the emission timing signal for controlling the emission period of the excitation light emitted by the light source 11a, the red light emitted by the light source 120, and the blue light emitted by the light source 124 in sync with the frame sync signal, and then supplies the light source drive section 62b and the rotational period determination section 102 with the emission timing signal.

The frame sync signal is a sync signal for determining the frame period of the picture, and is a pulse signal having a frame rate of, for example, 60 frames per second (fps). The emission timing signal is, for example, a positive active pulse signal sync with the frame sync signal as described above.

In the case of the present embodiment, each frame period is divided into two sub-frames, and the image for the right eye and the image for the left eye are alternately displayed in each sub-frame. The light source 11a, the light source 120, and the light source 124 light once in each sub-frame in sync with the timing at which the image for the right eye or the image for the left eye is displayed. Therefore, if the frame rate of the frame sync signal is 60 fps, the emission timing signal is a positive active pulse signal having a period of 1/120 second sync with the frame period.

The rotational period determination section 102 receives the emission timing signal supplied from the emission timing generation section 101, then calculates the rotational period of the rotating fluorescent plate 13 asynchronous with the pulse period of the emission timing signal, and then supplies the motor drive section 63 with the value (the rotational period value) of the rotational period. The rotational period determination section 102 obtains the rotational period value, which is not an integral multiple (is a non-integral multiple) of the pulse period of the emission timing signal and is not the quotient of the pulse period of the emission timing signal and an integral number (is the quotient of the pulse period of the emission timing signal and a non-integral number), and then supplies the motor drive section 63 with the rotational period value so that a first area of the fluorescent body 13b is irradiated with the excitation light in a certain round, and at least a part of the first area is not irradiated with the excitation light in the subsequent round when the rotating fluorescent plate 13 is rotating.

Further, the rotational period determination section 102 receives the position information of the rotary shaft Ax of the electric motor 14 supplied from the motor drive section 63, and then determines based on the position information whether or not the rotary shaft Ax of the electric motor 14 is rotating.

The light source drive section 62b receives the emission timing signal supplied from the emission timing generation section 101 of the control section 61, and then intermittently lights the light source 11a, the light source 120, and the light source 124 based on the timing indicated by the emission timing signal. Specifically, the light source drive section 62b lights the light source 11a, the light source 120, and the light source 124 in the positive period of the emission timing signal if the emission timing signal is a positive active pulse signal. In the present embodiment, the level of the excitation light emitted by the light source 11a is constant.

The motor drive section 63 receives the rotational period value supplied from the rotational period determination section 102 of the control section 61, then generates the rotation instruction signal for designating the rotational period value, and then supplies it to the electric motor 14 to thereby drive the electric motor 14. Further, the motor drive section 63 receives the position information of the rotary shaft Ax supplied from the electric motor 14, and then supplies the rotational period determination section 102 with the position information.

The image signal supply section 64 includes a sync signal generation section not shown, and supplies the emission timing generation section 101 of the control section 61 with the frame sync signal generated by the sync signal generation section. Further, the image signal supply section 64 receives the image output request signal supplied from the control section 61, and then supplies the red liquid crystal display element 30R, the green liquid crystal display element 30G, and the blue liquid crystal display element 30B with the image signal supplied externally in sync with the frame sync signal in accordance with the image output request signal.

Figure 12:
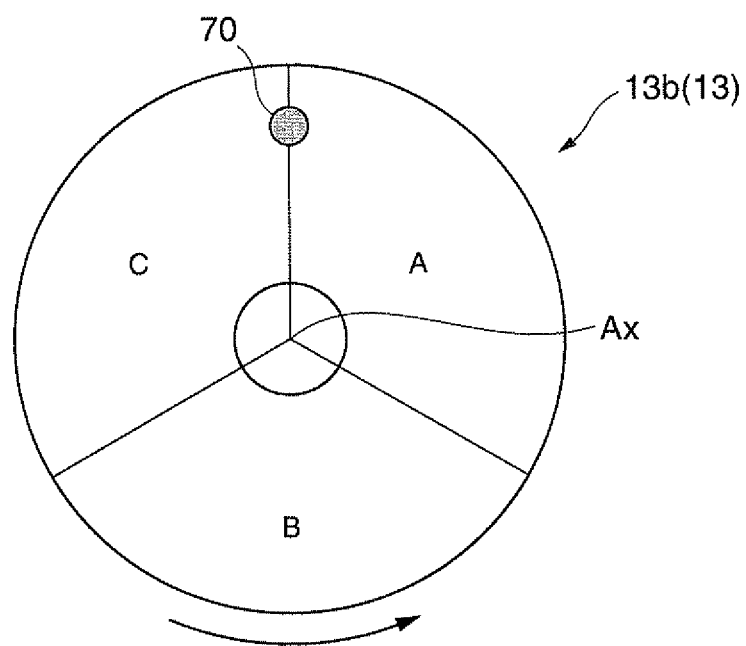
FIG. 12 is a diagram showing the fluorescent body divided into a plurality of segments along a rotational direction of the rotating fluorescent plate.
Figure 13:
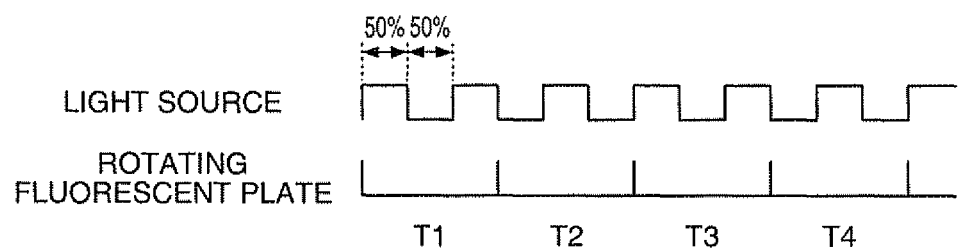
FIG. 13 is a diagram showing a relationship between the rotational period of the rotating fluorescent plate and emission timing of a light source.
Figure 14:
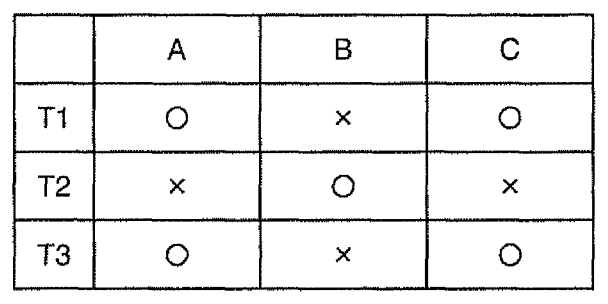

FIG. 12 is a diagram of the fluorescent body 13b imaginarily divided into a plurality of segments (fan-like areas centered on the rotary shaft) along the rotational direction of the rotating fluorescent plate 13. It should be noted that the division into the segments is only for the sake of convenience of explanation, and the fluorescent body is not actually divided. FIG. 13 is a diagram showing a relationship between the rotational period of the rotating fluorescent plate 13 and emission timing of the light source 11a. FIG. 14 is a diagram showing the segments (light-emitting segments) irradiated with the excitation light round by round in a time-series manner. In FIG. 14, "◯" represents that the light source is lighted, and "×" represents that the light source is not lighted.

As shown in FIG. 12, in the rotating fluorescent plate 13 of the present embodiment, the fluorescent body 13b is imaginarily divided into three segments (segment A through segment C) along the rotational direction of the rotating fluorescent plate 13. The light source 11a is repeatedly switched ON and OFF at constant time intervals, and the focused spot 70 on the fluorescent body 13b is irradiated with the excitation light intermittently at the constant time intervals. Since the rotating fluorescent plate 13 is rotating around the rotary shaft Ax, the focused spot 70 moves around the rotary shaft Ax on the fluorescent body 13b. Since the light source 11a is repeatedly switched ON and OFF at the constant time intervals, it is assumed that the fan-like area corresponding to the trajectory drawn by the focused spot 70 while the light source 11a is lighted once is one imaginary segment. For example, if the light source 11a is lighted when the segment A overlaps the focused spot 70 and the segment A is irradiated with the excitation light at the focused spot 70, the segment A is referred to as a light-emitting segment, and if the light source 11a is not lighted when the segment A overlaps the focused spot 70 and the segment A is not irradiated with the excitation light at the focused spot 70, the segment A is referred to as a non-light-emitting segment.

In the present embodiment, as described later, it is arranged that the period (a light-emitting period) in which the light source 11a is set to ON and the period (a non-light-emitting period) in which the light source 11a is set to OFF are equal to each other to thereby set the duty ratio of the light-emitting period to 50%. Therefore, it is repeated that one segment is set to the light-emitting segment, and then the segment next to the light-emitting segment is set to the non-light-emitting segment with the rotation of the rotating fluorescent plate 13. It should be noted that the central angles of the respective segments are equal to each other. It should be noted that the duty ratio of the light-emitting period is calculated by (light-emitting period)/((light-emitting period)+(non-light-emitting period)).

As shown in FIG. 13, in the case of the present embodiment, the 3D glasses are switched at 120 Hz, and the duty ratio of the open period (the period in which the image light is transmitted to thereby allow the user to visually recognize the image) is 50%. Since the light-emitting period (the light-emitting period of the light source 11a) of the fluorescent body 13b is also set to 120 Hz, and the duty ratio of 50% (the light-emitting period of 4.2 ms) coordinating with the 3D glasses, the rotational frequency of the rotating fluorescent plate 13 is set to, for example, 80 Hz (the rotational period of 12.5 ms).

Assuming that the light-emitting frequency (the switching frequency of the 3D glasses) when intermittently lighting the light source is α (Hz), and the adjustment factor is β, the rotational frequency of the rotating fluorescent plate 13 is calculated as α(Hz)×β. The adjustment factor β is calculated as β=1/(1+δ) assuming that the duty ratio of the light-emitting period of the light source 11a is δ. Since the rotational period of the rotating fluorescent plate 13 is an inverse of the rotational frequency, the rotational period of the rotating fluorescent plate 13 becomes (1+δ) times of the light-emitting period (1/α) of the light source 11a. Since the duty ratio δ fulfills 0<δ<1, the rotational period of the rotating fluorescent plate 13 becomes a non-integral multiple of the light-emitting period of the light source 11a.

As shown in FIG. 14, in the first cycle of the light emission of the fluorescent body 13b (the light source 11a), the segment A in FIG. 12 is irradiated with the excitation light at the focused spot 70, the segment C is irradiated with the excitation light at the focused spot 70 in the second cycle, the segment B is irradiated with the excitation light at the focused spot 70 in the third cycle, and the segment A is irradiated again with the excitation light at the focused spot 70 in the fourth cycle. From the viewpoint of the rotation of the rotating fluorescent plate 13, the segment A and the segment C are irradiated with the excitation light at the focused spot 70 in the first round (a period T1), the segment B is irradiated with the excitation light at the focused spot 70 in the second round (a period T2), and the segment A and the segment C are irradiated again with the excitation light at the focused spot 70 in the third round (a period T3). As described above, the state returns to the first round (the period T1) in the third round following the second round (the period T2), and the two cycles composed of the period T1 and the period T2 are repeated. In such a manner as described above, the different segment is irradiated with the excitation light in every round.

Since in this configuration, the light-emitting segment and the non-light-emitting element are swapped each other in every round of the rotating fluorescent plate 13, the light-emitting segment in a certain round and the light-emitting segment in the subsequent round do not overlap each other, and the non-light-emitting segment in a certain round and the non-light-emitting segment in the subsequent round also do not overlap each other.

Assuming that the least common multiple 25 ms (corresponding to two cycles of the rotational period of the rotating fluorescent plate 13) of the rotational period 12.5 ms of the rotating fluorescent plate 13 and the light-emitting period (the switching period of the 3D glasses) 8.33 ms of the light source 11a is one unit time, the initial state is restored in the one unit time, and the same is thereafter repeated. The light-emitting periods of the respective segments each appear once while the rotating fluorescent plate 13 makes two revolutions, and are arranged to be equal to each other. Therefore, the time average of the irradiation light intensity is equal between the segments (segment A through segment C). In other words, the cumulative light intensity of the excitation light incident on each segment per unit time is equal between all of the segments (segment A through segment C). Thus, the region irradiated with the excitation light is dispersed and averaged in a positional and temporal manner, and thus it is prevented that the light is locally concentrated in a short period of time to thereby raise the temperature.

Figure 15:
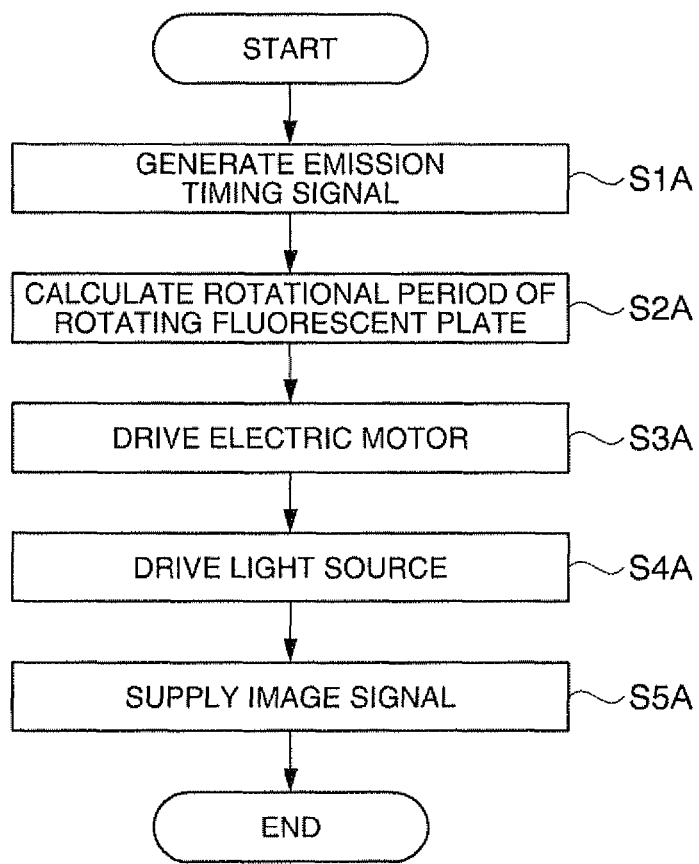
FIG. 15 is a flowchart showing a procedure of a process executed by the control system of the projector.

FIG. 15 is a flowchart showing a procedure of a process executed by the control system of the projector 1b.

When the control section 61 starts the control program, and the sync signal generation section of the image signal supply section 64 starts generation of the frame sync signal, the process of the flowchart shown in the drawing is started.

Firstly, in the step S1A, the emission timing generation section 101 receives the frame sync signal supplied from the image signal supply section 64, then generates the emission timing signal sync with the frame sync signal, and then supplies the light source drive section 62b and the rotational period determination section 102 with the emission timing signal. For example, the emission timing generation section 101 receives the frame sync signal with the period of 1/120 second from the image signal supply section 64, then generates the emission timing signal with the period of 1/120 second sync with the frame sync signal, and then supplies the light source drive section 62b and the rotational period determination section 102 with the emission timing signal.

Subsequently, in the step S2A, the rotational period determination section 102 receives the emission timing signal supplied from the emission timing generation section 101, then calculates the rotational period of the rotating fluorescent plate 13 asynchronous with the pulse period of the emission timing signal, and then supplies the motor drive section 63 with the rotational period value. For example, if the pulse period of the emission timing signal is 1/120 second, the rotational period determination section 102 applies 1.5 as a non-integral number to thereby obtain 1.5/120 second, which is a value obtained by multiplying 1/120 second by 1.5, as the rotational period value, and then supplies it to the motor drive section 63. The non-integral number (denoting 1.5 in this example) can be determined in advance or arbitrarily set by the operator.

Then, in the step S3A, the motor drive section 63 receives the rotational period value supplied from the rotational period determination section 102, then generates the rotation instruction signal for designating the rotational period value, and then supplies it to the electric motor 14 to thereby drive the electric motor 14. For example, the motor drive section 63 receives 1.5/120 as the rotational period value supplied from the rotational period determination section 102, then generates the rotation instruction signal designating the rotational period value, namely the rotation instruction signal which instructs the electric motor 14 to rotate the rotary shaft Ax at 120/1.5 (=80) revolution per second, and then supplies it to the electric motor 14.

Then, the motor drive section 63 receives the position information of the rotary shaft Ax supplied from the electric motor 14, and then supplies the rotational period determination section 102 with the position information.

Subsequently, the rotational period determination section 102 receives the position information of the rotary shaft Ax supplied from the motor drive section 63, and then determines based on the position information whether or not the electric motor 14 is rotating. If the rotational period determination section 102 determines that the electric motor 14 does not perform the rotational operation, the rotational period determination section 102 sets an abnormal flag representing an abnormal state. Then, if the abnormal flag is set, the control section 61 generates an alarm signal and outputs it to the outside, for example.

In the step S4A, the light source drive section 62b receives the emission timing signal supplied from the emission timing generation section 101, and then lights the light source 11a, the light source 120, and the light source 124 based on the emission timing signal. For example, if the pulse period of the emission timing signal is 1/120 second (the positive active period is 0.5/120 second assuming that the duty ratio is 50%), the light source drive section 62b lights the light source 11a, the light source 120, and the light source 124 in the positive period (the period of 0.5/120 second) of the emission timing signal.

Then, in the step S5A, the control section 61 supplies the image signal supply section 64 with the image output request signal.

Subsequently, the image signal supply section 64 receives the image output request signal supplied from the control section 61, and then supplies the red liquid crystal display element 30R, the green liquid crystal display element 30G, and the blue liquid crystal display element 30B with the image signal supplied externally in sync with the frame sync signal in accordance with the image output request signal.

In the projector 1b according to the present embodiment described hereinabove, since the emission period (e.g., 1/120 second) of the excitation light emitted by the light source 11a and the rotational period (e.g., 1.5/120 second) of the rotating fluorescent plate 13 are different from each other and asynchronous with each other, the area irradiated with the excitation light on the fluorescent body 13b of the rotating fluorescent plate 13 circles with time. The area irradiated with the excitation light of the fluorescent body 13b varies between the rounds, and there occurs a position which is not irradiated with the excitation light continuously in a certain round and the subsequent round. Therefore, the rise in temperature of the fluorescent body 13b can be reduced compared to the case in which the area irradiated with the excitation light of the fluorescent layer is always the same in every round. Therefore, the projector 1b having the fluorescent body 13b difficult to be deteriorated and difficult to be degraded in wavelength conversion efficiency can be provided.

Further, in the projector 1b according to the present embodiment, if the fluorescent body 13b is divided into a plurality of segments (the segment A, the segment B, and the segment C) along the rotational direction of the rotating fluorescent plate 13, the cumulative light intensity of the excitation light incident on each of the segments per unit time is equal between the segments. Therefore, it is possible to prevent the degree of deterioration of the fluorescent body 13b and the level of the wavelength conversion efficiency of the fluorescent body 13b from varying between the segments. Therefore, the projector which has longer operating life and is difficult to cause the variation in luminance between the rounds can be provided.

Here, as a comparative example, the case in which the rotation of the rotating fluorescent plate and the intermittent emission of the light source are sync with each other will be explained. In order to irradiate all of the segments equally with the excitation light while synchronizing the rotation of the rotating fluorescent plate and the intermittent emission of the light source with each other, it is necessary to make the rotational period of the rotating fluorescent plate and the light-emitting period of the light source equal to each other. Otherwise, it results that a specific segment is always irradiated with the excitation light. In order to make the rotational period of the rotating fluorescent plate and the light-emitting period of the light source equal to each other while synchronizing the rotation of the rotating fluorescent plate and the intermittent emission of the light source with each other, it is necessary to rotate the rotating fluorescent plate at extremely high speed. The higher the rotational frequency of the rotating fluorescent plate is, the higher the levels of the noise and power consumption of the electric motor become. However, according to the projector 1b of the present embodiment, the rotational frequency of the rotating fluorescent plate can be made lower than in the case of synchronizing the rotation of the rotating fluorescent plate with the light emission of the light source.

Fourth Embodiment

Figure 16:
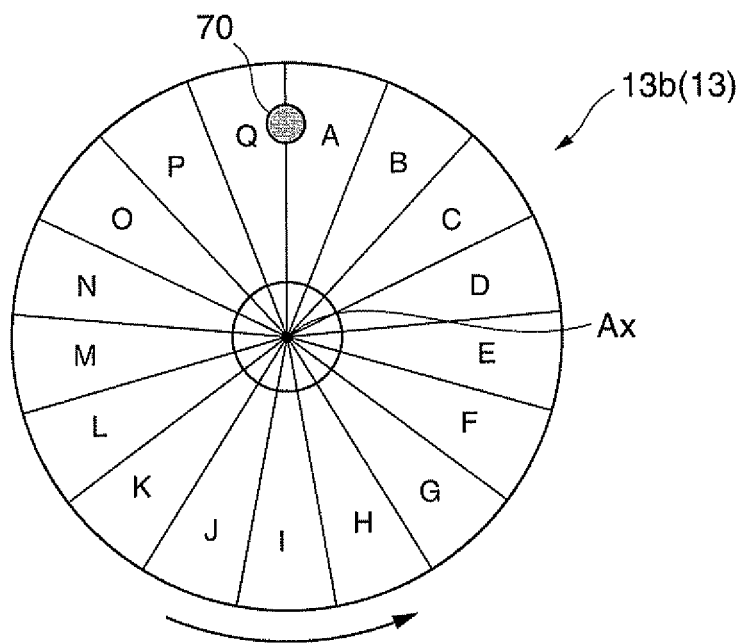
FIG. 16 is a diagram showing the fluorescent body divided into a plurality of segments along a rotational direction of the rotating fluorescent plate in a projector according to a fourth embodiment of the invention.
Figure 17:
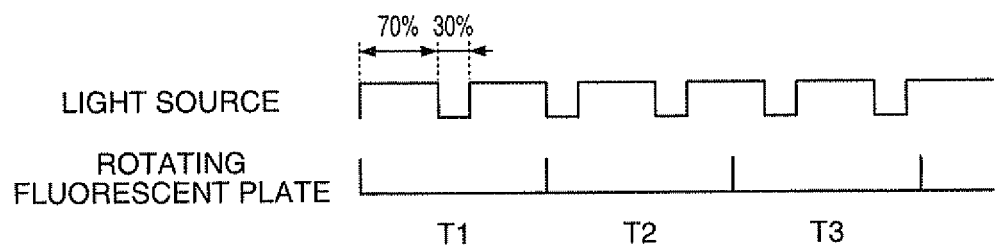
FIG. 17 is a diagram showing a relationship between the rotational period of the rotating fluorescent plate and emission timing of a light source.

FIG. 16 is a diagram showing the fluorescent body 13b divided into a plurality of segments (fan-like areas) along the rotational direction of the rotating fluorescent plate 13 in a projector according to a fourth embodiment. FIG. 17 is a diagram showing a relationship between the rotational period of the rotating fluorescent plate 13 and the emission timing of the light source 11a. FIG. 18 is a diagram showing the segments (light-emitting segments) irradiated with the excitation light round by round in a time-series manner. In FIG. 18, "○" represents that the light source is lighted, and "×" represents that the light source is not lighted.

As shown in FIG. 16, in the rotating fluorescent plate 13 of the present embodiment, the fluorescent body 13b is imaginarily divided into seventeen segments (segment A through segment Q) along the rotational direction of the rotating fluorescent plate 13. The light source is repeatedly switched ON and OFF at constant time intervals, and the fluorescent body 13b is irradiated with the excitation light at the focused spot 70 intermittently at the constant time intervals. In the present embodiment, as described later, it is arranged that the ratio between the period (the light-emitting period) in which the light source 11a is set to ON and the period (the non-light-emitting period) in which the light source 11a is set to OFF is set to 7:3 to thereby set the duty ratio of the light-emitting period to 70%. Therefore, it is repeated that seven successive segments are lighted, and then following three successive segments are not lighted with the rotation of the rotating fluorescent plate 13. It should be noted that the central angles of the respective seventeen segments are equal to each other. It should be noted that one of the segments in the fourth embodiment is a fan-like area obtained by dividing the fan-like area corresponding to the trajectory drawn by the focused spot 70 while the light source 11a is lighted once into seven equal parts.

As shown in FIG. 17, in the case of the present embodiment, the 3D glasses are switched at 120 Hz, and the duty ratio of the open period (the period in which the image light is transmitted to thereby allow the user to visually recognize the image) is 70%. Since the light-emitting period (the light-emitting period of the light source 11a) of the fluorescent body 13b is also set to 120 Hz, and the duty ratio of 70% coordinating with the 3D glasses, the rotational frequency of the rotating fluorescent plate 13 is set to, for example, 120 Hz×1/(1+0.7)=70.6 Hz (the rotational period of 14.17 ms).

As shown in FIG. 18, from the viewpoint of the rotation of the rotating fluorescent plate 13, in the first round (the period T1), the segments A through G consecutive to each other are lighted, and the following segments H through J consecutive to each other are not lighted. Further, the following segments K through Q consecutive to each other are lighted. In the subsequent second round (the period T2), the following segments A through C consecutive to each other are not lighted, the following segments D through J consecutive to each other are lighted, the following segments K through M consecutive to each other are not lighted, and the following segments N through Q consecutive to each other are lighted. Subsequently, the state is returned to the initial state in the ten revolutions (after the period T10 has elapsed) while shifting the non-light-emitting segments round by round as shown in FIG. 18, and the ten cycles composed of the period T1 through the period T10 are repeated.

According to this configuration, the non-light-emitting segments in a certain round and the non-light-emitting segments in the subsequent round do not overlap each other.

Assuming that the least common multiple 141.7 ms (corresponding to ten cycles of the rotational period of the rotating fluorescent plate 13) of the rotational period 14.17 ms of the rotating fluorescent plate 13 and the light-emitting period (the switching period of the 3D glasses) 8.33 ms of the light source 11a is one unit time, the initial state is restored in the one unit time, and the same is thereafter repeated. The light-emitting periods of the respective segments each appear seven times while the rotating fluorescent plate 13 makes ten revolutions, and are arranged to be equal to each other. Therefore, the time average of the irradiation light intensity of the excitation light is equal between the segments (segment A through segment Q). In other words, the cumulative light intensity of the excitation light incident on each segment per unit time is equal between all of the segments (segment A through segment Q). Thus, the region irradiated with the excitation light is dispersed and averaged in a positional and temporal manner, and thus it is prevented that the light is locally concentrated in a short period of time to thereby raise the temperature.

In the projector according to the present embodiment, since the duty ratio of the light-emitting period exceeds 50%, it is not possible for the light-emitting segments in a certain round and the light-emitting segments in the subsequent round not to overlap each other. Therefore, any of the seventeen segments becomes the light-emitting segment in successive two rounds, which is unavoidable. However, by adjusting the relationship between the rotational frequency of the rotating fluorescent plate 13 and the light-emitting frequency (the emission frequency of the excitation light) of the light source 11a, it is possible to circle the position irradiated with the excitation light on the fluorescent body 13b with time similarly to the third embodiment. Therefore, the temperature of the fluorescent body 13b is prevented from excessively rising, and the projector having the fluorescent body 13b difficult to be deteriorated and difficult to be degraded in wavelength conversion efficiency can be provided.

Fifth Embodiment

Figure 19:
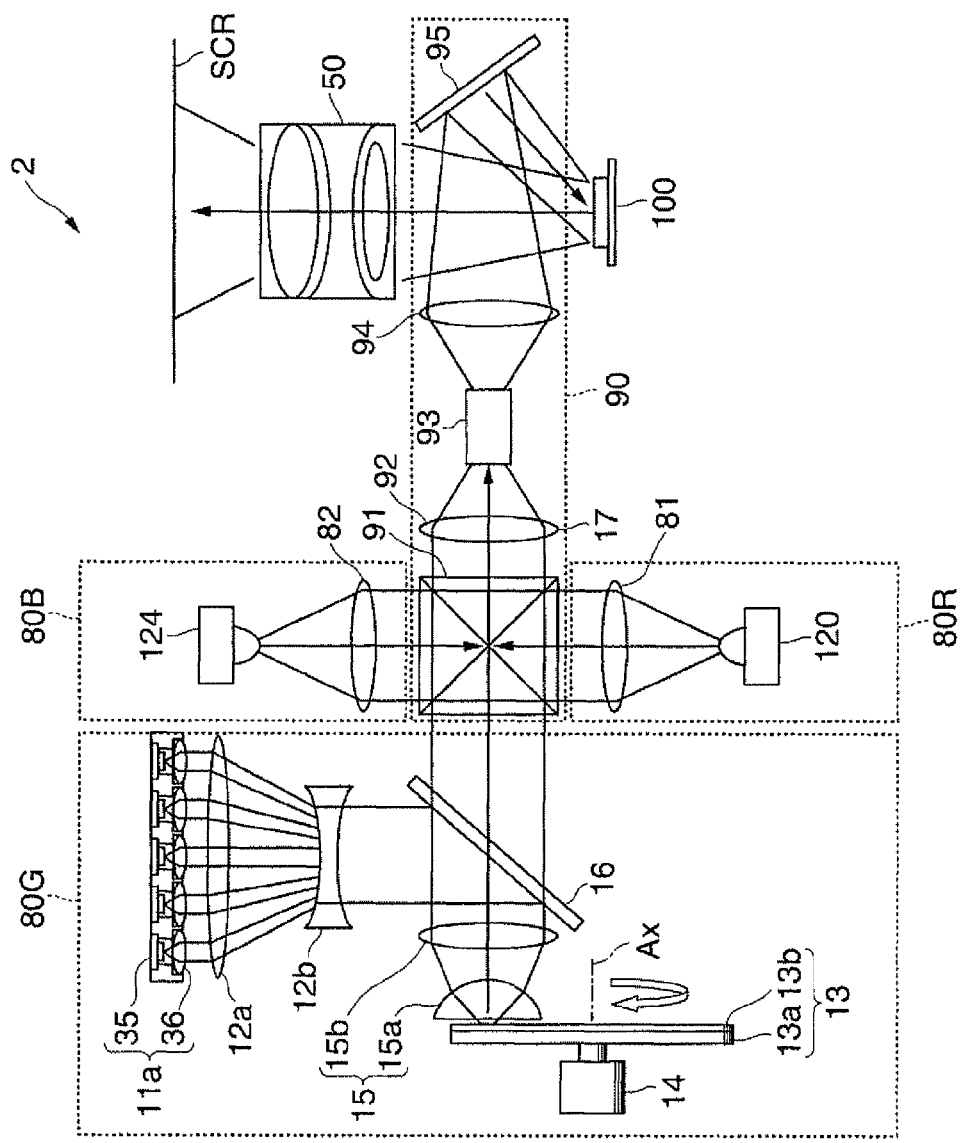
FIG. 19 is a schematic diagram of a projector according to a fifth embodiment of the invention.

FIG. 19 is a schematic diagram of a projector 2 according to a fifth embodiment.

In the present embodiment, the constituents common to the projector 2 and the projector 1b according to the third embodiment are denoted by the same reference symbols, and the detailed explanation therefor will be omitted.

The projector 2 is provided with a red light source device 80R, a green light source device 80G, a blue light source device 80B, a second color combining optical system 90, a micromirror light modulation element 100, and the projection optical system 50.

The green light source device 80G is provided with the light source 11a, the collecting lens 12a, the collimating lens 12b, the rotating fluorescent plate 13, the electric motor 14, the pickup optical system 15, and a dichroic mirror 16.

The configurations of the light source 11a, the collecting lens 12a, the collimating lens 12b, the rotating fluorescent plate 13, the electric motor 14, the pickup optical system 15, and the dichroic mirror 16 are the same as those explained in the third embodiment.

The excitation light emitted from the light source 11a is collimated by the collimating lens 36, and the light beam thereof is once thinned by the collecting lens 12a and the collimating lens 12b. Subsequently, the light path thereof is folded 90 degrees by the dichroic mirror 16, and then the excitation light is focused on the fluorescent body 13b of the rotating fluorescent plate 13 by the pickup optical system 15. The green light emitted from the fluorescent body 13b is roughly collimated by the pickup optical system 15. Subsequently, the residual excitation light is removed therefrom by the dichroic mirror 16, and then the green light enters the second color combining optical system 90.

The red light source device 80R is provided with the light source 120 and a collimating lens 81. The configuration of the light source 120 is the same as that explained in the third embodiment. The red light emitted from the light source 120 is roughly collimated by the collimating lens 81, and then enters the second color combining optical system 90.

The blue light source device 80B is provided with the light source 124 and a collimating lens 82. The configuration of the light source 124 is the same as that explained in the third embodiment. The blue light emitted from the light source 124 is roughly collimated by the collimating lens 82, and then enters the second color combining optical system 90.

The second color combining optical system 90 is provided with a cross dichroic prism 91, a collecting lens 92, a rod integrator 93, a collecting lens 94, and a reflecting mirror 95.

The cross dichroic prism 91 is an optical member formed by bonding four rectangular prisms to each other to form a cube. On the boundary surfaces having an X shape on which the rectangular prisms are bonded to each other, there are formed dielectric multilayer films. The dielectric multilayer film formed on one of the X-shaped interfaces is for reflecting the red light, and the dielectric multilayer film formed on the other of the interfaces is for reflecting the blue light. The cross dichroic prism 91 aligns the proceeding directions of the red light and the blue light changed in proceeding direction by the dielectric multilayer films and the green light transmitted through the dielectric multilayer films.

The red light source device 80R, the green light source device 80G, and the blue light source device 80B are alternately driven in a time-shared manner. The red light, the green light, and the blue light emitted in series from the red light source device 80R, the green light source device 80G, and the blue light source device 80B are aligned in the proceeding direction by the cross dichroic prism 91, then collected by the collecting lens 92, and then homogenized in the luminance distribution by the rod integrator 93. The red light, the green light, and the blue light emitted from the rod integrator 93 are recollected by the collecting lens 94, then reflected by the reflecting mirror 95, and then enter the micromirror light modulation element 100 in series.

The micromirror light modulation element 100 is a reflective light modulation element manufactured using the micro electromechanical systems (MEMS) technology. As the micromirror light modulation element 100, a Digital Micromirror Device (DMD; a trademark of Texas Instruments) is used. The micromirror light modulation element 100 modulates the red light, green light, and the blue light input in series from the reflecting mirror 95 based on the image signal supplied externally to thereby generate the red image light, the green image light, and the blue image light in series. The red image light, the green image light, and the blue image light are sequentially projected on the screen SCR by the projection optical system 50 in an enlarged manner, and are mixed by the eyes of the user to be recognized as a color image.

In the case of the present embodiment, the projector 2 is a projector for displaying a 2D image. Each of the frame periods is divided into three sub-frame periods, and the red image light, the green image light, and the blue image light are generated in series in the respective sub-frame periods. The red light source device 80R, the green light source device 80G, and the blue light source device 80B are made to have the output light intensity of zero (extinction) when the image light of another color is generated in order to reduce the power consumption. Therefore, in the red light source device 80R, the green light source device 80G, and the blue light source device 80B, there is performed intermittent emission of setting the device to ON only in a specific sub-frame period, and setting the device to OFF in the other sub-frame periods.

Figure 20:
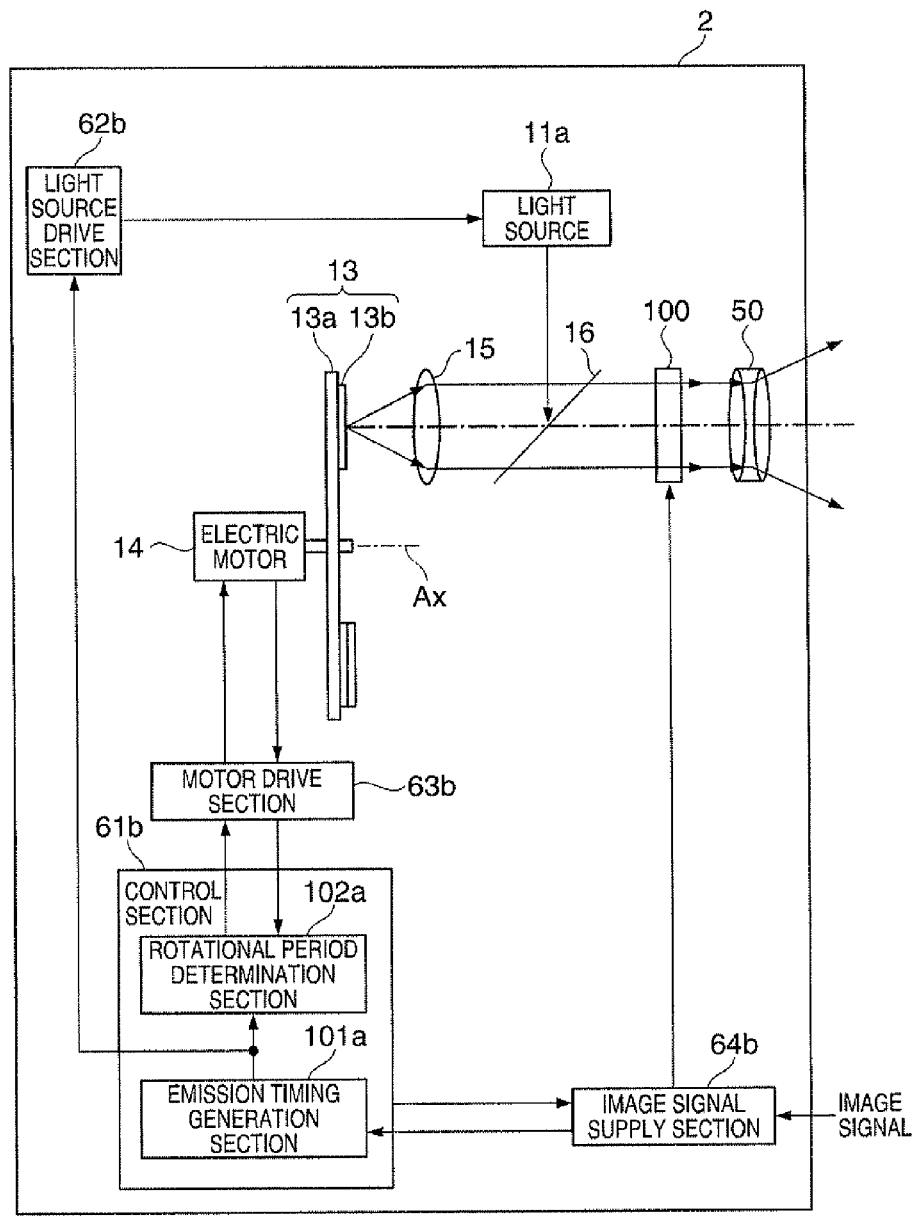
FIG. 20 is a block diagram showing a functional configuration of a control system for controlling an operation of the projector.

FIG. 20 is a block diagram showing a functional configuration of the control system for controlling an operation of the projector 2. In FIG. 20, only the constituents necessary for the drive control of the light source 11a, which is one of the specifically characterizing sections in the invention, are extracted from the constituents shown in FIG. 19, and are shown in a simplified manner.

The projector 2 is provided with the control section (the control device) 61b, the light source drive section 62b, the motor drive section 63b, and the image signal supply section 64b as the control system.

As the functional constituents, the control section 61b is provided with the emission timing generation section 101a as the emission timing generation device, and the rotational period determination section 102a as the rotational period determination device.

The emission timing generation section 101a receives the frame sync signal supplied from the image signal supply section 64b, then generates a first emission timing signal for controlling the emission period of the excitation light emitted by the light source 11a, a second emission timing signal for controlling the emission period of the red light emitted by the light source 120, and a third emission timing signal for controlling the emission period of the blue light emitted by the light source 124 in sync with the frame sync signal. Then, the emission timing generation section 101a supplies the light source drive section 62b with the first emission timing signal, the second emission timing signal, and the third emission timing signal. Further, the emission timing generation section 101a supplies the rotational period determination section 102a with the first emission timing signal.

The frame sync signal is a sync signal for determining the frame period of the picture, and is a pulse signal having a frame rate of, for example, 60 frames per second (fps). The first through third emission timing signals are each, for example, a positive active pulse signal sync with the frame sync signal as described above.

In the case of the present embodiment, the light source 11a, the light source 120, and the light source 124 are lighted once in each of the frame periods. Therefore, if the frame rate of the frame sync signal is 60 fps, the first through third emission timing signals are each a positive active pulse signal having a period of 1/60 second sync with the frame frequency.

The rotational period determination section 102a receives the first emission timing signal supplied from the emission timing generation section 101a, then calculates the rotational period of the rotating fluorescent plate 13 asynchronous with the pulse period of the first emission timing signal, and then supplies the motor drive section 63b with the value (the rotational period value) of the rotational period. The rotational period determination section 102a obtains the rotational period value, which is not an integral multiple (is a non-integral multiple) of the pulse period of the first emission timing signal and is not the quotient of the pulse period of the first emission timing signal and an integral number (is the quotient of the pulse period of the first emission timing signal and a non-integral number), and then supplies the motor drive section 63b with the rotational period so that a first area of the fluorescent body 13b is irradiated with the excitation light in a certain round, and at least a part of the first area is not irradiated with the excitation light in the subsequent round when the rotating fluorescent plate 13 is rotating.

Further, the rotational period determination section 102a receives the position information of the rotary shaft Ax of the electric motor 14 supplied from the motor drive section 63b, and then determines based on the position information whether or not the rotary shaft Ax of the electric motor 14 is rotating.

The light source drive section 62b receives the first through third emission timing signals supplied from the emission timing generation section 101a of the control section 61b, and then intermittently lights the light source 11a, the light source 120, and the light source 124 based on the timing indicated by the first through third emission timing signals. In other words, if the first through third emission timing signals are the positive active pulse signals, the light source drive section 62b lights the light source 11a in the positive period of the first emission timing signal, lights the light source 120 in the positive period of the second emission timing signal, and lights the light source 124 in the positive period of the third emission timing signal. In the present embodiment, the level of the excitation light emitted by the light source 11a is constant.

The motor drive section 63b receives the rotational period value supplied from the rotational period determination section 102a of the control section 61b, then generates the rotation instruction signal for designating the rotational period value, and then supplies it to the electric motor 14 to thereby drive the electric motor 14. Further, the motor drive section 63b receives the position information of the rotary shaft Ax supplied from the electric motor 14, and then supplies the rotational period determination section 102a with the position information.

The image signal supply section 64b includes a sync signal generation section not shown, and supplies the emission timing generation section 101a of the control section 61b with the frame sync signal generated by the sync signal generation section. Further, the image signal supply section 64b receives the image output request signal supplied from the control section 61b, and then supplies the micromirror light modulation element 100 with the image signal supplied externally in sync with the frame sync signal in accordance with the image output request signal.

Figure 21:
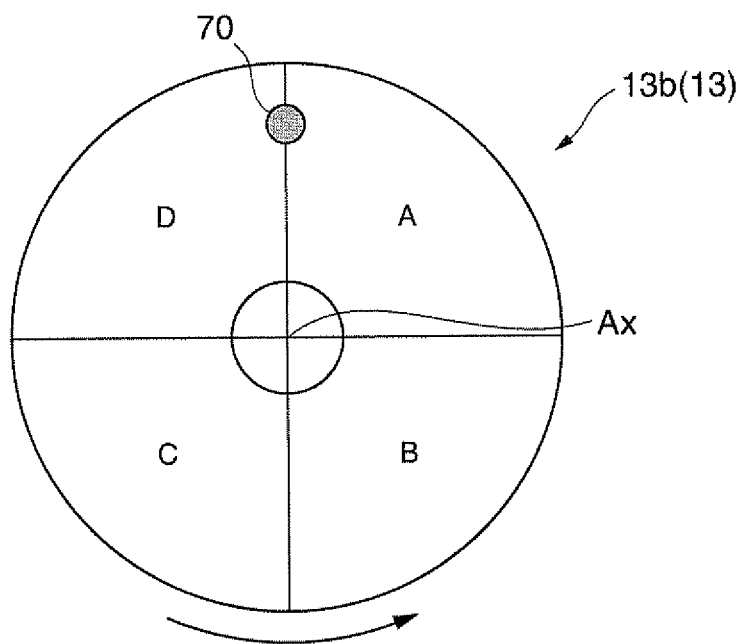
FIG. 21 is a diagram showing the fluorescent body divided into a plurality of segments along a rotational direction of the rotating fluorescent plate.
Figure 22:
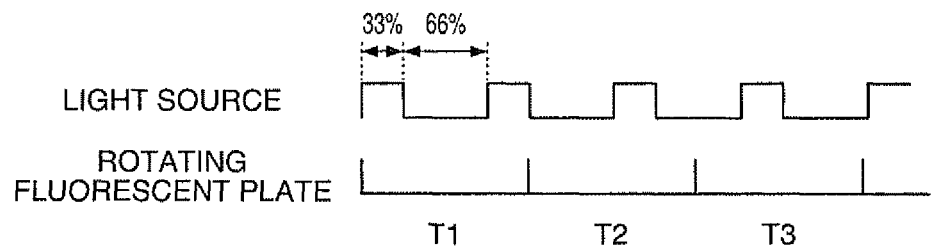
FIG. 22 is a diagram showing a relationship between the rotational period of the rotating fluorescent plate and emission timing of a light source.
Figure 23:
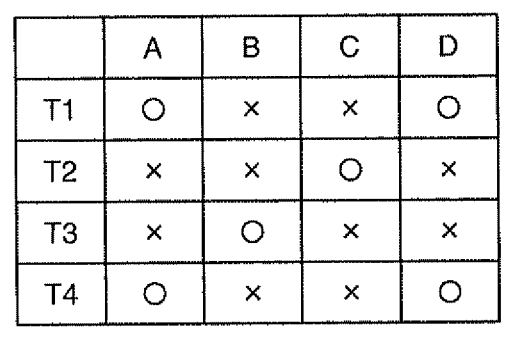

FIG. 21 is a diagram showing the fluorescent body 13b divided into a plurality of segments (fan-like areas) along the rotational direction of the rotating fluorescent plate 13. FIG. 22 is a diagram showing a relationship between the rotational period of the rotating fluorescent plate 13 and the emission timing of the light source 11a. FIG. 23 is a diagram showing the segments (light-emitting segments) irradiated with the excitation light round by round in a time-series manner. In FIG. 23, "○" represents that the light source is lighted, and "×" represents that the light source is not lighted.

As shown in FIG. 21, in the rotating fluorescent plate 13 of the present embodiment, the fluorescent body 13b is imaginarily divided into four segments (segment A through segment D) along the rotational direction of the rotating fluorescent plate 13. The light source is repeatedly switched ON and OFF at constant time intervals, and the fluorescent body 13b is irradiated with the excitation light at the focused spot 70 intermittently at the constant time intervals. In the present embodiment, as described later, it is arranged that the ratio between the period (the light-emitting period) in which the light source 11a is set to ON and the period (the non-light-emitting period) in which the light source 11a is set to OFF is set to 1:2 to thereby set the duty ratio of the light-emitting period to 1/3. Therefore, in the present embodiment, it is repeated that one segment is set to the light-emitting segment, and then the following two successive segments are set to the non-light-emitting segments with the rotation of the rotating fluorescent plate 13. It should be noted that the central angles of the respective four segments are equal to each other. It should be noted that one of the segments in the fifth embodiment is a fan-like area corresponding to the trajectory drawn by the focused spot 70 while the light source 11a is lighted once.

As shown in FIG. 22, the emission frequency (the emission frequency of the light source) of the fluorescent body 13b is 60 Hz, the duty ratio thereof is 33%. In this case, the rotational frequency of the rotating fluorescent plate 13 is set to, for example, 120 Hz×1/(1+0.33)=90 Hz (the rotational period of 11.1 ms).

As shown in FIG. 23, from the viewpoint of the rotation of the rotating fluorescent plate 13, in the first round (the period T1), the segment A is lighted, the following segments B and C consecutive to each other are not lighted, and the following segment D is lighted. In the subsequent second round (the period T2), the following segments A and B consecutive to each other are not lighted, the following segment C is lighted, and the following segment D is not lighted. Subsequently, the state is returned to the initial state in the three revolutions (after the period T3 has elapsed) while shifting the non-light-emitting segments round by round as shown in FIG. 23, and the three cycles composed of the period T1 through the period T3 are repeated.

According to this configuration, the light-emitting segments in a certain round and the light-emitting segments in the subsequent round do not overlap each other. The light-emitting periods of the respective segments each appear once while the rotating fluorescent plate 13 makes three revolutions, and are arranged to be equal to each other. Therefore, the time average of the irradiation light intensity of the excitation light is equal between the segments (segment A through segment D).

Assuming that the least common multiple 33.33 ms (corresponding to three cycles of the rotational period of the rotating fluorescent plate 13) of the rotational period 11.1 ms of the rotating fluorescent plate 13 and the light-emitting period 16.66 ms of the light source 11a is one unit time, the initial state is restored in the one unit time, and the same is thereafter repeated. The light-emitting periods of the respective segments each appear once while the rotating fluorescent plate 13 makes three revolutions, and are arranged to be equal to each other. Therefore, the time average of the irradiation light intensity of the excitation light is equal between the segments (segment A through segment D). In other words, the cumulative light intensity of the excitation light incident on each segment per unit time is equal between all of the segments (segment A through segment D). Thus, the region irradiated with the excitation light is dispersed and averaged in a positional and temporal manner, and thus it is prevented that the light is locally concentrated in a short period of time to thereby raise the temperature.

In the projector 2 according to the present embodiment, since the duty ratio of the light-emitting period is lower than 50%, it is not possible for the non-light-emitting segments in a certain round and the non-light-emitting segments in the subsequent round not to overlap each other. Therefore, any of the four segments becomes the non-light-emitting segment in successive two rounds, which is unavoidable. However, by adjusting the relationship between the rotational frequency of the rotating fluorescent plate 13 and the light-emitting frequency (the emission frequency of the excitation light at the focused spot 70) of the light source 11a, it is possible to circle the position irradiated with the excitation light on the fluorescent body 13b with time similarly to the third embodiment. Therefore, the temperature of the fluorescent body 13b is prevented from excessively rising, and the projector having the fluorescent body 13b difficult to be deteriorated and difficult to be degraded in wavelength conversion efficiency can be provided.

Sixth Embodiment

Although in the third embodiment, an example of applying the illumination device according to the invention to the projector for displaying a 3D image is described, an example of applying the illumination device according to the invention to the projector for displaying a 2D image will be described in the sixth embodiment. It should be noted that since the configuration of the projector for displaying a 2D image is the same as the configuration of the projector 1b for displaying a 3D image shown in the third embodiment, the explanation related to the configuration of the projector will be omitted.

In the projector according to the present embodiment, the tint of the image generated can be controlled by controlling the emission of the green light from the fluorescent body 13b. Since the functional configuration of the control system for controlling the operation of the projector according to the present embodiment is similar to the functional configuration of the control system for controlling the operation of the projector 1b, the control system will be explained with reference to FIG. 11 if necessary. Further, since in the projector according to the sixth embodiment, the fluorescent body 13b is imaginarily divided into three segments (fan-like areas) along the rotational direction of the rotating fluorescent plate 13 similarly to the third embodiment, the present embodiment will be explained with reference to FIG. 12 if necessary. It should be noted that the explanation overlapping the third embodiment will be omitted.

Figure 24:
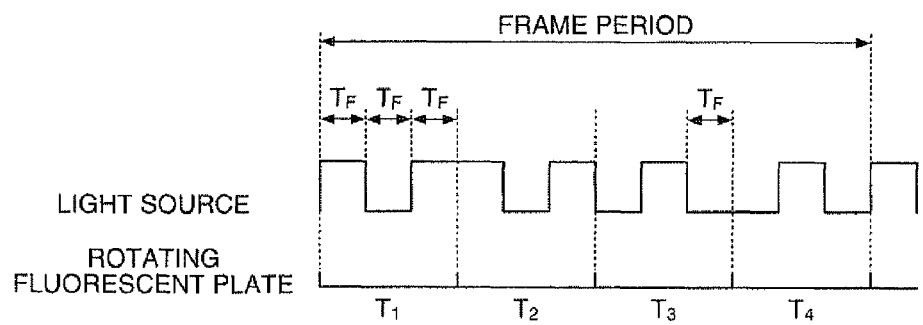
FIG. 24 is a diagram showing a relationship between the rotational period of the rotating fluorescent plate and emission timing of a light source in a projector according to a sixth embodiment of the invention.
Figure 25:
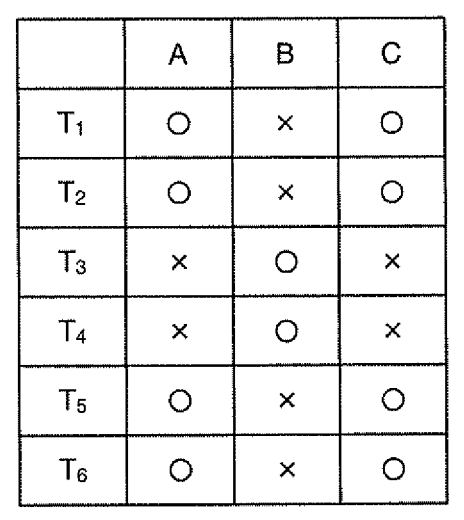

FIG. 24 is a diagram showing a relationship between the rotational period of the rotating fluorescent plate 13 and the emission timing of the light source 11a. FIG. 25 is a diagram showing the segments (light-emitting segments) irradiated with the excitation light round by round in a time-series manner. In FIG. 25, "○" represents that the light source is lighted, and "×" represents that the light source is not lighted.

Firstly, a control method of the light source 11a and the electric motor 14 will be explained with reference to FIG. 11. In the present embodiment, the light source 11a is lighted intermittently in order to control the emission of the green light from the fluorescent body 13b to a half of the maximum output.

The emission timing generation section 101 receives the frame sync signal supplied from the image signal supply section 64 and an adjustment factor for controlling the emission of the green light. The emission timing generation section 101 generates the emission timing signal for controlling the emission period of the excitation light emitted by the light source 11a based on the frame sync signal and the adjustment factor, and then supplies the light source drive section 62b and the rotational period determination section 102 with the emission timing signal. The emission timing signal is, for example, a positive active pulse signal. The light source 11a intermittently emits the excitation light as shown in FIG. 24 based on the emission timing signal.

The minimum unit time of the emission of the light source 11a and the minimum unit time of the extinction of the light source 11a are denoted by TF. The minimum unit time TF of the emission is one twelfth of the frame period.

The rotational period determination section 102 receives the emission timing signal supplied from the emission timing generation section 101, and then calculates the rotational period of the rotating fluorescent plate 13. The rotational period determination section 102 determines the rotational period value so that when the rotating fluorescent plate 13 is rotating, the first area of the fluorescent body 13b is irradiated with the excitation light in a certain round, and at least a part of the first area is not irradiated with the excitation light in another round. Specifically, the rotational period of the rotating fluorescent plate 13 is set to three times of TF.

As shown in FIG. 12, in the rotating fluorescent plate 13 of the present embodiment, the fluorescent body 13b is imaginarily divided into three segments (segment A through segment C) along the rotational direction of the rotating fluorescent plate 13. It should be noted that the central angles of the respective three segments are equal to each other. It should be noted that one of the segments in the sixth embodiment is a fan-like area corresponding to the trajectory drawn by the focused spot 70 during the period of the minimum unit time TF during which the light source 11a is lighted.

If the emission timing signal and the rotational period of the rotating fluorescent plate 13 are set as described above, the emission timing of the segment A through the segment C becomes as shown in FIG. 25. From the viewpoint of the rotating fluorescent plate 13, in the first round (the period T1) and the second round (the period T2) following the first round, the segment A is the light-emitting segment, the following segment B is the non-light-emitting segment, and the following segment C is the light-emitting segment. Further, in the third round (the period T3) following the second round and the fourth round (the period T4) following the third round, the segment A is the non-light-emitting segment, the subsequent segment B is the light-emitting segment, and the subsequent segment C is the non-light-emitting segment. In the fifth round (the period T5) following the fourth round, the segment A is the light-emitting segment, the subsequent segment B is the non-light-emitting segment, and the subsequent segment C is the light-emitting segment. As described above, the state returns to the first round (the period T1) in the fifth round following the fourth round (the period T4), and the four cycles composed of the period T1 through the period T4 are repeated.

In the emission timing described above, the segment A and the segment C are irradiated with the excitation light consecutively in the first round and the second round. However, the segment A and the segment C are not irradiated with the excitation light consecutively in the third round following the second round and in the fourth round (the period T4). Therefore, the rise in temperature of the fluorescent body 13b can be reduced compared to the case in which the area irradiated with the excitation light of the fluorescent layer is always the same in every round.

As shown in FIG. 24, the average light intensity of the green light emitted from the green light source device 10G becomes equal between the frame periods, and it is possible to weaken the average light intensity of the green light by half compared to the case of emitting the green light from the green light source device 10G in the entire period in each of the frame periods. In such a manner as described above, the coloration of the image generated can be controlled.

Further, assuming that the frame period is one unit time, the period in which each of the segments emits light appears twice in one unit time, which is equal between the segments. Therefore, the time average of the irradiation light intensity of the excitation light is equal between the segments (segment A through segment C). In other words, the cumulative light intensity of the excitation light incident on each segment per unit time is equal between all of the segments (segment A through segment C). Thus, the region irradiated with the excitation light is dispersed and averaged in a positional and temporal manner, and thus it is prevented that the light is locally concentrated in a short period of time to thereby raise the temperature.

MODIFIED EXAMPLES

Although in the third through fifth embodiments the fluorescent body 13b is disposed on the circular disk 13a, it is also possible to use the substrate having the fluorescent material dispersed inside the circular disk 13a.

It should be noted that although in the first and second embodiments described above there is adopted the configuration of forming the fluorescent body 113b on one surface of the substrate (the circular disk 113a) having a light transmissive property, and making the excitation light enter from the circular disk 113a side to thereby irradiate the fluorescent body 113b, it is also possible to adopt the configuration of making the excitation light enter from the fluorescent body 113b side to thereby irradiate the fluorescent body 113b, and reflecting the fluorescence thus generated with the circular disk 113a to thereby take out the fluorescence. In this case, it is not necessary for the substrate (the circular disk 113a) to have the light transmissive property.

Further, in the first and second embodiments described above, the projectors 1, 1a each adopting the red liquid crystal display element 30R, the green liquid crystal display element 30G, and the blue liquid crystal display element 30B of the transmissive type are shown. Besides the above, it is also possible to use, for example, three reflective liquid crystal display elements, and to configure the color separation light guide optical system so as to be suitable for the reflective liquid crystal display elements.

Further, in the third through fifth embodiments, the projector for 3D display providing the non-light-emitting period between the image for the right eye and the image for the left eye, and the projector for 2D display sequentially generating the red image light, the green image light, and the blue image light using the field sequential method are explained as examples of the projector intermittently lighting the light source 11a. However, the configuration of the projector is not limited thereto. The invention can widely be applied to the configuration of intermittently lighting the light source to thereby intermittently irradiate the fluorescent body 13b on the rotating substrate with the excitation light.

Although the embodiments of the invention are hereinabove described in detail with reference to the accompanying drawings, the specific configuration is not limited to the embodiments described above, but the design and so on within the scope or the spirit of the invention are also included therein.

The entire disclosure of Japanese Patent Application No.: 2011-011919, filed on Jan. 24, 2011 and 2011-145410, filed on Jun. 30, 2011 are expressly incorporated by reference herein.

What is claimed is:

1. An illumination device comprising:
a substrate including a fluorescent layer, and capable of rotating around a predetermined rotary shaft, the fluorescent layer having a ring-shape around the rotary shaft;
a light source, the light source intermittently emitting an excitation light to excite the fluorescent layer;
an emission timing generation device adapted to generate an emission timing signal for controlling an emission timing of the light source, the emission timing signal having a period synchronous with a frame period;
a rotational period determination device adapted to control the rotation of the substrate so that the rotation of the substrate is asynchronous with emission of the excitation light, and so that, when the substrate is rotating, a first area of the fluorescent layer is irradiated with the excitation light in one round, and at least a part of the first area is not irradiated with the excitation light in another round; and
an electric motor adapted to rotate the substrate,
a cumulative light intensity of the excitation light incident on a first area of the florescent layer per unit time being equal to a cumulative light intensity of the excitation light incident on a second area of the florescent layer per unit time, the second area being a different area from the first area along a rotational direction of the substrate, and
the cumulative light intensity of the excitation light incident per unit time being equal between all areas of the fluorescent layer,
wherein the rotational period determination device determines a period, which is $(1+\delta)$ times of a period of the emission timing signal, as a rotational period of the substrate, where $\delta$ $(0<\delta<1)$ is a duty ratio of a light-emitting period of the light source.

2. The illumination device according to claim 1, wherein the rotational period determination device controls the rotation of the substrate so that, when the substrate is rotating, an area of the fluorescent layer irradiated with the excitation light in the one round and an area of the fluorescent layer irradiated with the excitation light in the another round do not overlap each other.

3. The illumination device according to claim 1, wherein the rotational period determination device controls the rotation of the substrate so that, when the substrate is rotating, an area of the fluorescent layer that is not irradiated with the excitation light in the one round and an area of the fluorescent layer that is not irradiated with the excitation light in the another round do not overlap each other.

4. The illumination device according to claim 1, wherein the another round is a round following the one round.

5. The illumination device according to claim 1, wherein the rotational period determination device determines the rotational period which is a quotient of the period of the emission timing signal and a non-integral number.

6. The illumination device according to claim 1, further comprising:
   a light detection section adapted to detect fluorescence emitted from the fluorescent layer;
   a light source drive section adapted to make the light source emit light at the period of the emission timing signal; and
   a light source output level adjustment section,
   wherein the light source output level adjustment section generates an emission level correction signal in accordance with a detection result of the light detection section, and
   the light source drive section corrects an output level of the excitation light emitted from the light source in accordance with the emission level correction signal.

7. The illumination device according to claim 6, wherein the rotational period determination device determines the rotational period which is a quotient of the period of the emission timing signal and a non-integral number.

8. The illumination device according to claim 1, wherein the duty ratio $\delta$ is smaller than or equal to 0.5.

9. A projector comprising:
   a substrate including a fluorescent layer, and capable of rotating around a predetermined rotary shaft, the fluorescent layer having a ring-shape around the rotary shaft;
   a light source, the light source intermittently emitting an excitation light to excite the fluorescent layer;
   an emission timing generation device adapted to generate an emission timing signal for controlling an emission timing of the light source, the emission timing signal having a period synchronous with a frame period;
   a rotational period determination device adapted to control the rotation of the substrate so that the rotation of the substrate is asynchronous with emission of the excitation light, and so that, when the substrate is rotating, a first area of the fluorescent layer is irradiated with the excitation light in one round, and at least a part of the first area is not irradiated with the excitation light in another round;
   an electric motor adapted to rotate the substrate;
   a light modulation element adapted to modulate fluorescence emitted from the fluorescent layer with an image signal; and
   a projection optical system adapted to project the fluorescence modulated by the light modulation element,
   a cumulative light intensity of the excitation light incident on a first area of the florescent layer per unit time being equal to a cumulative light intensity of the excitation light incident on a second area of the florescent layer per unit time, the second area being a different area from the first area along a rotational direction of the substrate, and
   the cumulative light intensity of the excitation light incident per unit time being equal between all areas of the fluorescent layer,
   wherein the rotational period determination device determines a period, which is $(1+\delta)$ times of a period of the emission timing signal, as a rotational period of the substrate, where $\delta$ $(0<\delta<1)$ is a duty ratio of a light-emitting period of the light source.

10. The projector according to claim 9, further comprising:
   a light detection section adapted to detect fluorescence emitted from the fluorescent layer;
   a light source drive section adapted to make the light source emit light at the period of the emission timing signal; and
   a light source output level adjustment section,
   wherein the light source output level adjustment section generates an emission level correction signal in accordance with a detection result of the light detection section, and
   the light source drive section corrects an output level of the excitation light emitted from the light source in accordance with the emission level correction signal.

* * * * *